(12) United States Patent
Moon et al.

(10) Patent No.: US 9,155,090 B2
(45) Date of Patent: Oct. 6, 2015

(54) APPARATUS AND METHOD FOR TRANSMITTING AND RECEIVING REFERENCE SIGNAL IN WIRELESS COMMUNICATION SYSTEM

(71) Applicants: Samsung Electronics Co. Ltd., Suwon-si, Gyeonggi-do (KR); Korea Advanced Institute of Science and Technology, Daejeon (KR)

(72) Inventors: Jung-Min Moon, Seoul (KR); Byung-Chang Chung, Seoul (KR); Dong-Ho Cho, Seoul (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 92 days.

(21) Appl. No.: 13/780,775

(22) Filed: Feb. 28, 2013

(65) Prior Publication Data
US 2013/0225189 A1    Aug. 29, 2013

(30) Foreign Application Priority Data

Feb. 29, 2012    (KR) .......................... 10-2012-0021080

(51) Int. Cl.
*H04W 72/04*    (2009.01)
*H04L 1/00*    (2006.01)
(Continued)

(52) U.S. Cl.
CPC ........... *H04W 72/042* (2013.01); *H04L 1/0026* (2013.01); *H04L 5/005* (2013.01); *H04L 5/0037* (2013.01); *H04L 5/0007* (2013.01); *H04L 5/0062* (2013.01); *H04L 2001/0093* (2013.01); *H04W 72/082* (2013.01)

(58) Field of Classification Search
CPC .................................................... H04W 72/042
USPC ............... 455/450, 452.1, 456.5, 456.6, 464; 370/337, 342, 347, 479, 491, 498, 503, 370/509
See application file for complete search history.

(56) References Cited

U.S. PATENT DOCUMENTS

2009/0122782 A1* 5/2009 Horn et al. .................... 370/350
2011/0275397 A1   11/2011 Guey et al.
2011/0287797 A1   11/2011 Iwai et al.
(Continued)

FOREIGN PATENT DOCUMENTS

KR    10-2009-0107535 A    10/2009
KR    10-2010-0065048 A    6/2010
(Continued)

OTHER PUBLICATIONS

Agisilaos Papadogiannis, et al. "A dynamic clustering approach in wireless networks with multi-cell cooperative processing" 2008.

*Primary Examiner* — Cong Tran
(74) *Attorney, Agent, or Firm* — Jefferson IP Law, LLP

(57) ABSTRACT

An apparatus and a method for transmitting and receiving a reference signal in a wireless communication system are provided. The method includes determining a cluster-specific reference signal configuration according a cluster configuration, transmitting information about the cluster-specific reference signal configuration, and transmitting cluster-specific reference signals of at least one cluster according to the cluster-specific reference signal configuration.

10 Claims, 14 Drawing Sheets

(51) Int. Cl.
*H04W 72/08* (2009.01)
*H04L 5/00* (2006.01)

(56) References Cited

U.S. PATENT DOCUMENTS

2011/0317656 A1 12/2011 Rajih et al.
2012/0046038 A1 2/2012 Gao et al.
2012/0087394 A1* 4/2012 Ma et al. ................ 375/146
2012/0294253 A1* 11/2012 Yoon et al. ............. 370/329

FOREIGN PATENT DOCUMENTS

KR 10-2010-0126837 A 12/2010
KR 10-2011-0010538 A 2/2011

* cited by examiner

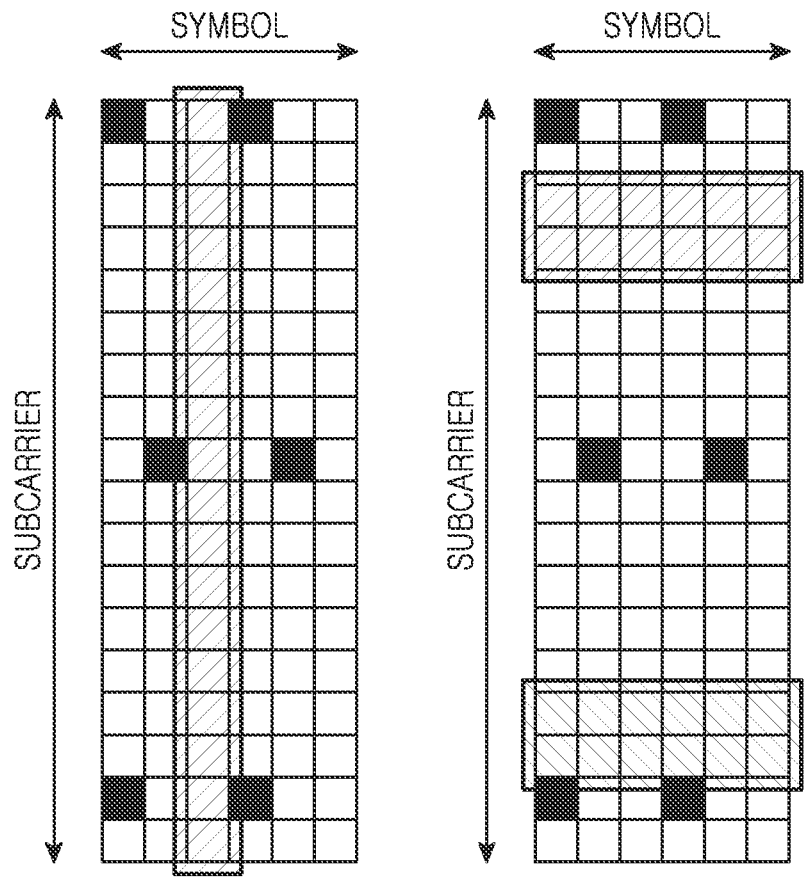
FIG.3A  FIG.3B
 : CELL-SPECIFIC REFERENCE SIGNAL
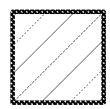 : CLUSTER-SPECIFIC REFERENCE SIGNAL REGION

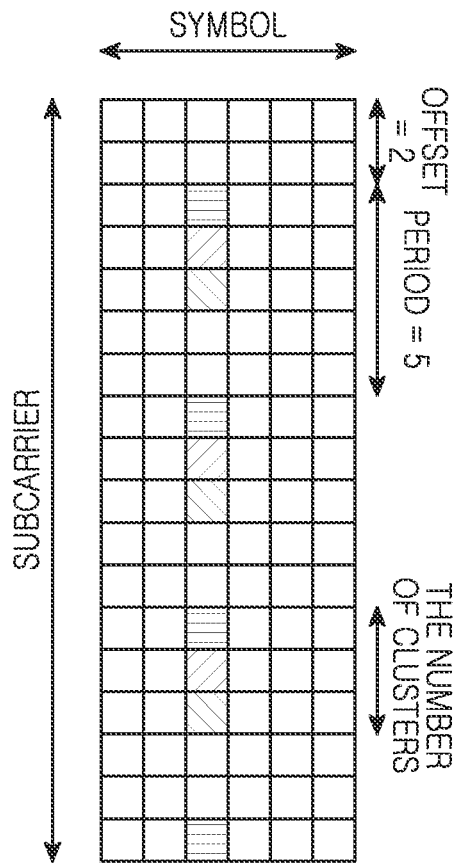
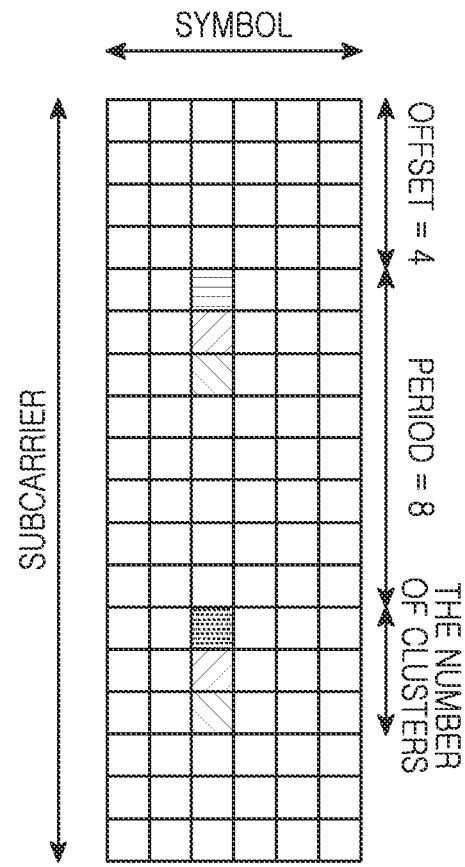
FIG.4A  FIG.4B
 : REFERENCE SIGNAL OF CLUSTER 1
 : REFERENCE SIGNAL OF CLUSTER 2
 : REFERENCE SIGNAL OF CLUSTER 3

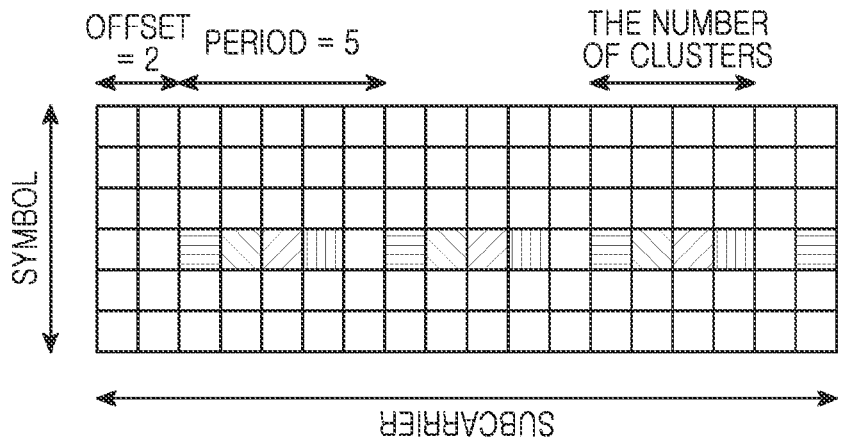
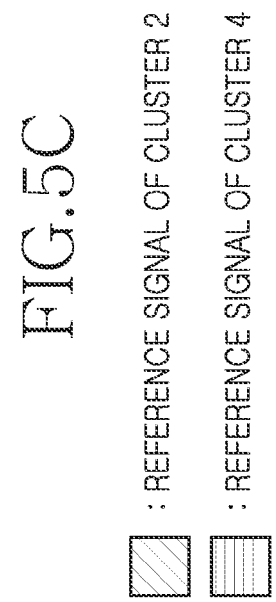
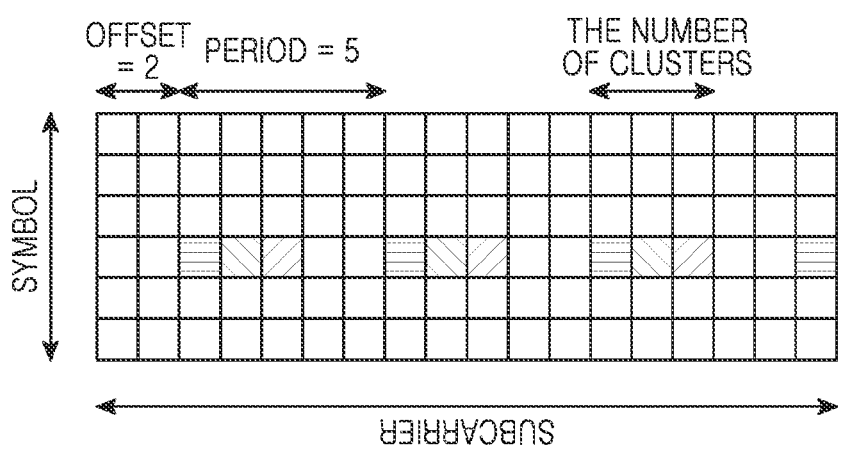
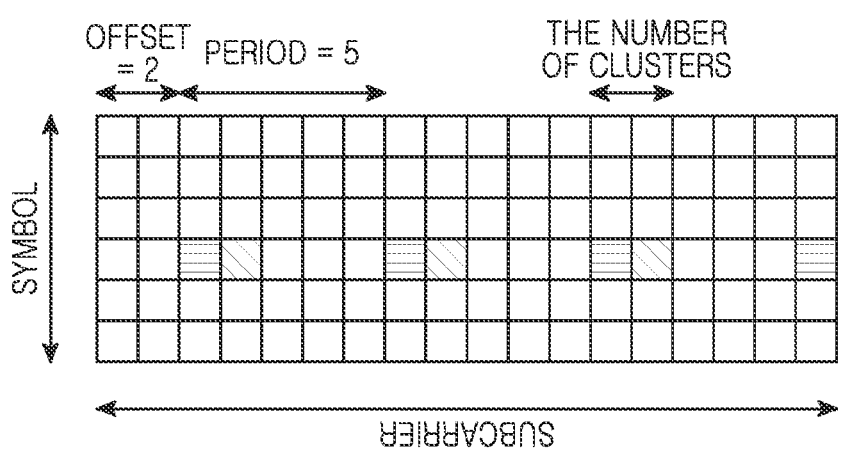
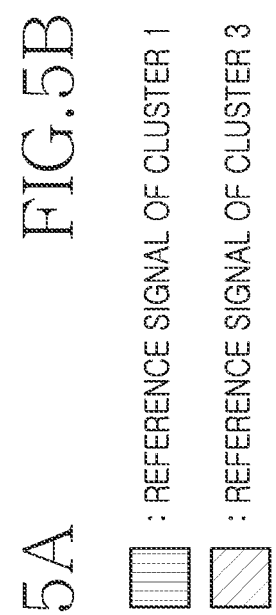

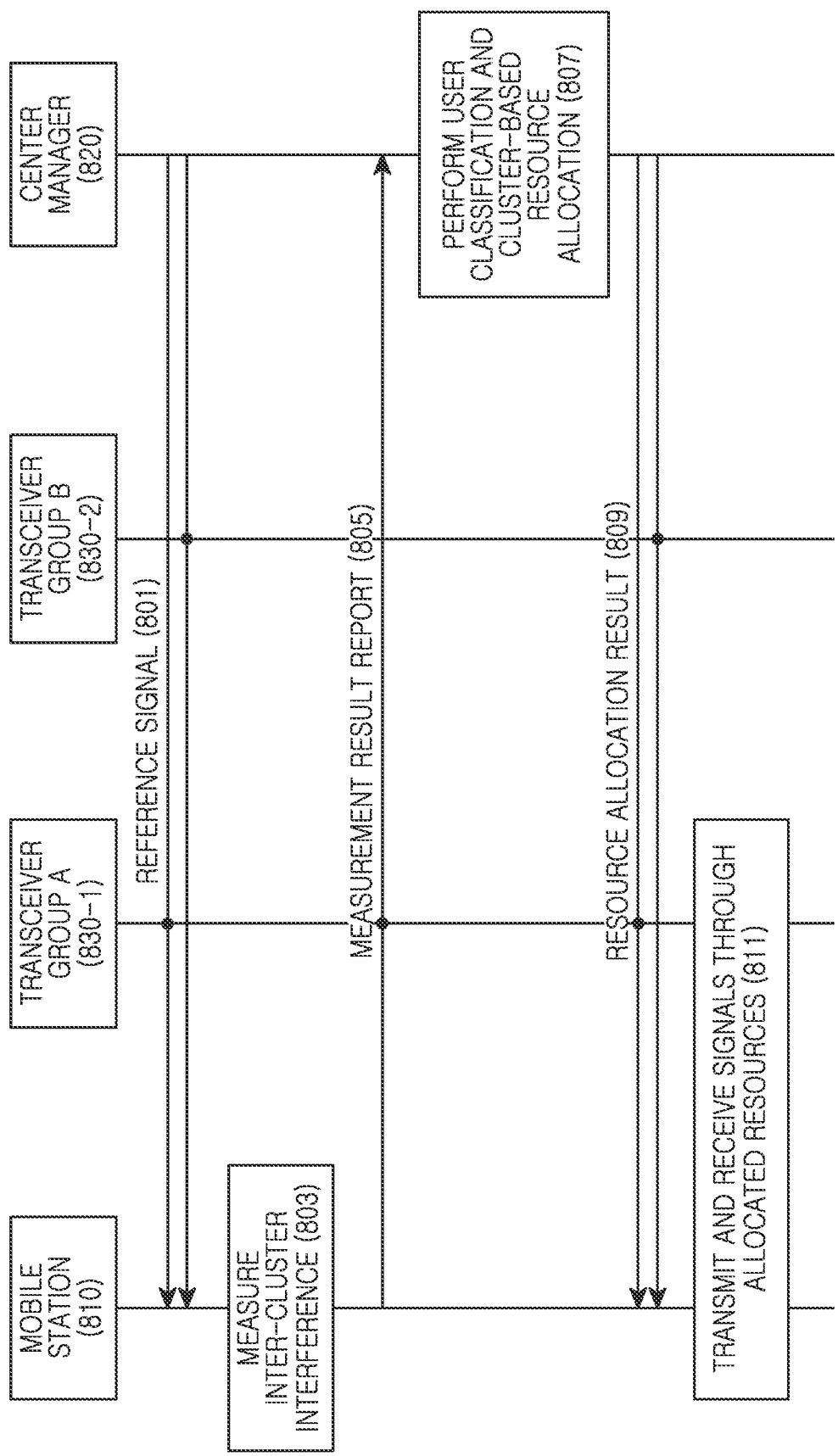

APPARATUS AND METHOD FOR TRANSMITTING AND RECEIVING REFERENCE SIGNAL IN WIRELESS COMMUNICATION SYSTEM

PRIORITY

This application claims the benefit under 35 U.S.C. §119(a) of a Korean patent application filed on Feb. 29, 2012 in the Korean Intellectual Property Office and assigned Serial No. 10-2012-0021080, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) Samsung Electronics Co., Ltd., and 2) Korea Advanced Institute of Science and Technology.

BACKGROUND OF THE INVENTION

1. Field of the Invention

The present invention relates to a wireless communication system. More particularly, the present invention relates to transmitting and receiving a reference signal in a wireless communication system.

2. Description of the Related Art

The aim of a communication system is to transmit a large amount of data at low error probability. To achieve the aim, it is essential to secure high system capacity. Recently, there have been femtocell technologies for reducing an interval between a user and a Radio Access Unit (RAU) by reducing a cell radius and for improving performance through the reduced interval, Coordinated MultiPoint (CoMP) technologies for improving cell-edge user performance using cooperative transmission of adjacent base stations, Virtual Cell Network (VCN) technologies, etc.

A VCN refers to a topology for adaptively building a virtual cell to optimize use efficiency of frequency resources in a multiple cell environment having different user/traffic/interference characteristics and providing a service. Distributed small base stations which belong to the virtual cell may share information in real time and may control interference using a transmission scheme such as coordinated beamforming based on the shared information. In order to operate a wireless communication system to which the VCN technologies are applied, an apparatus and method for effectively transmitting a control signal such as a reference signal according to a cell configuration which is dynamically changed is needed.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for transmitting and receiving a reference signal in a wireless communication system.

Another aspect of the present invention is to provide an apparatus and method for providing a reference signal suitable for a cluster configuration in a wireless communication system.

Another aspect of the present invention is to provide an apparatus and method for dynamically changing a cluster configuration in a wireless communication system.

Another aspect of the present invention is to provide an apparatus and method for controlling inter-cluster interference in a wireless communication system.

In accordance with an aspect of the present invention, an operation method of a base station in a wireless communication system is provided. The method includes determining a cluster-specific reference signal configuration according a cluster configuration, transmitting information about the cluster-specific reference signal configuration, and transmitting cluster-specific reference signals of at least one cluster according to the cluster-specific reference signal configuration, wherein the cluster denotes a service coverage unit configured by at least one transceiver set, and wherein the information about the cluster-specific reference signal configuration includes at least one of a resource region allocated for the cluster-specific reference signal, an offset indicating a resource position where the cluster-specific reference signal is started, a period indicating an interval at which a cluster-specific reference signal of a same cluster is repeated, a number of clusters indicating the number of clusters configured by the base station, and an index indicating an order of a cluster-specific reference signal allocated to each cluster.

In accordance with another aspect of the present invention, an operation method of a mobile station in a wireless communication system is provided. The method includes acquiring information about a cluster-specific reference signal configuration, and receiving cluster-specific reference signals of at least one cluster according to the cluster-specific reference signal configuration, wherein the cluster denotes a service coverage unit configured by at least one transceiver set, and wherein the information about the cluster-specific reference signal configuration includes at least one of a resource region allocated for the cluster-specific reference signal, an offset indicating a resource position where the cluster-specific reference signal is started, a period indicating an interval at which a cluster-specific reference signal of a same cluster is repeated, a number of clusters indicating the number of clusters configured by a base station, and an index indicating an order of a cluster-specific reference signal allocated to each cluster.

In accordance with another aspect of the present invention, a apparatus in a wireless communication system is provided. The apparatus includes a controller configured to determine a cluster-specific reference signal configuration according a cluster configuration and a plurality of transceivers, each of the transceivers configured to transmit information about the cluster-specific reference signal configuration and to transmit cluster-specific reference signals of at least one cluster according to the cluster-specific reference signal configuration, wherein the cluster denotes a service coverage unit configured by at least one transceiver set, and wherein the information about the cluster-specific reference signal configuration includes at least one of a resource region allocated for the cluster-specific reference signal, an offset indicating a resource position where the cluster-specific reference signal is started, a period indicating an interval at which a cluster-specific reference signal of a same cluster is repeated, a number of clusters indicating the number of clusters configured by a base station, and an index indicating an order of a cluster-specific reference signal allocated to each cluster.

In accordance with another aspect of the present invention, a apparatus in a wireless communication system is provided. The apparatus includes a controller configured to acquire information about a cluster-specific reference signal configuration and a modem configured to receive cluster-specific reference signals of at least one cluster according to the cluster-specific reference signal configuration, wherein the cluster denotes a service coverage unit configured by at least one transceiver set, and wherein the information about the cluster-specific reference signal configuration includes at least one of a resource region allocated for the cluster-specific reference signal, an offset indicating a resource position where the cluster-specific reference signal is started, a period indicating an interval at which a cluster-specific reference signal of a same cluster is repeated, a number of clusters indicating the number of clusters configured by a base station, and an index indicating an order of a cluster-specific reference signal allocated to each cluster.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 3A and 3B illustrate allocation examples of cluster-specific reference signal regions in a wireless communication system according to an exemplary embodiment of the present invention;

FIGS. 4A and 4B illustrate setup examples of cluster-specific reference signals according to reference signal density in a wire communication system according to an exemplary embodiment of the present invention;

FIGS. 5A to 5C illustrate setup examples of cluster-specific reference signals according to a number of clusters in a wireless communication system according to an exemplary embodiment of the present invention;

FIG. 8 is a signal sequence diagram illustrating use examples of cluster-specific reference signals in a wireless communication system according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a description will be given for an apparatus and method for transmitting and receiving a reference signal in a wireless communication system. The reference signal denotes a signal transmitted and received by a value which is appointed in advance between a transmitting end and a receiving end. In an exemplary embodiment of the present invention, the term "reference signal" is used. However, the reference signal may be referred to by another term, such as a pilot signal, a training signal, etc.

Figure 1:
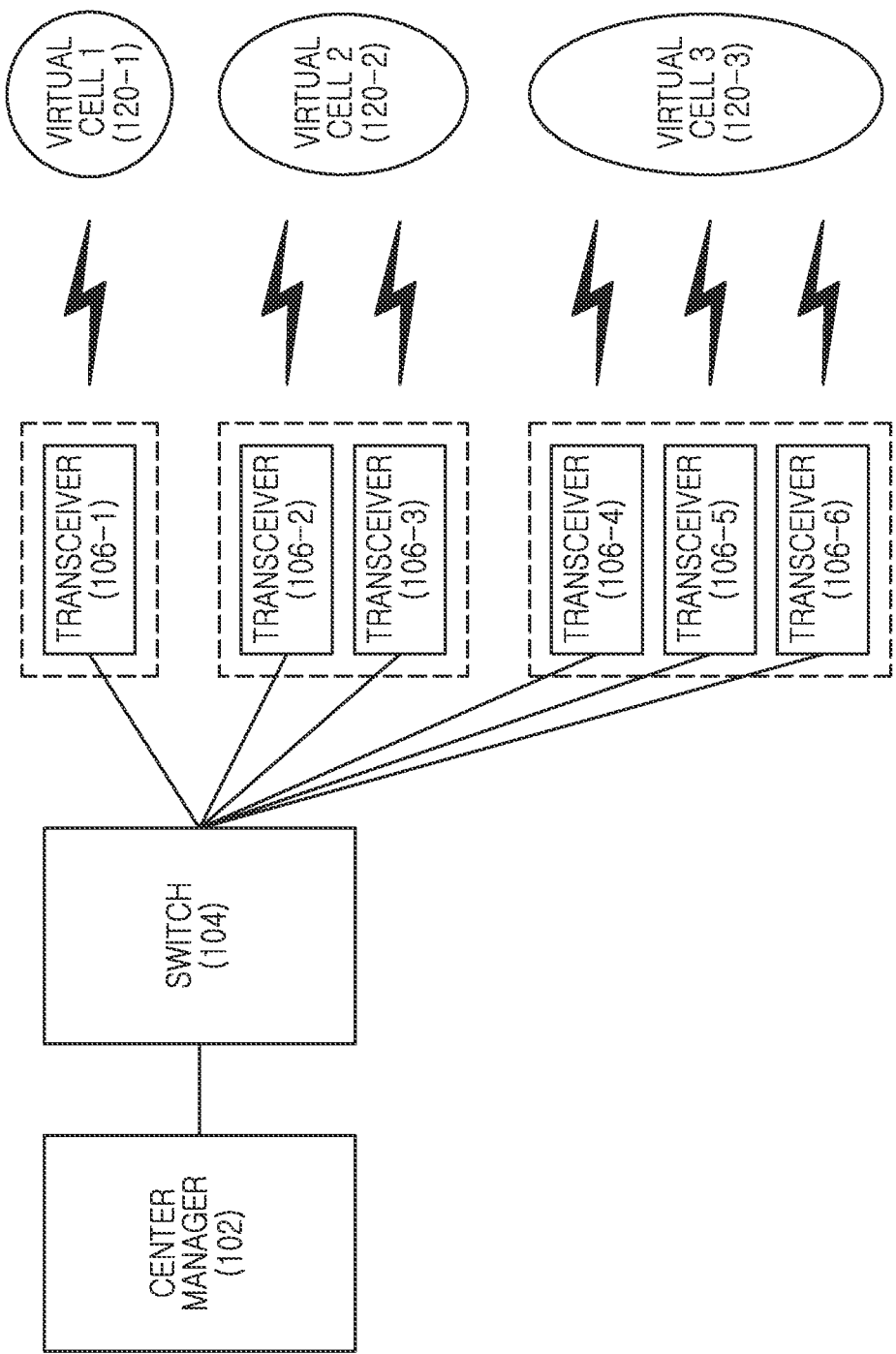
FIG. 1 illustrates a schematic network structure of a wireless communication system according to an exemplary embodiment of the present invention.

FIG. 1 illustrates a schematic network structure of a wireless communication system according to an exemplary embodiment of the present invention.

Referring to FIG. 1, the wireless communication system according to an exemplary embodiment of the present invention includes a center manager 102, a switch 104, a plurality of transceivers 106-1 to 106-6, and a plurality of virtual cells 120-1 to 120-3 configured by the plurality of transceivers 106-1 to 106-6.

The center manager 102 collects information about communication environments of the plurality of transceivers 106-1 to 106-6 and optimizes a cell configuration. The switch 104 distributes data or signals from the center manager 102 to the plurality of transceivers 106-1 to 106-6 and provides data or signals from the plurality of transceivers 106-1 to 106-6 to the center manager 102. The switch 104 may be included in a part of the center manager 102. The plurality of transceivers 106-1 to 106-6 are distributed and installed with one another, and transmit and receive signals through wireless channels. In accordance with an exemplary embodiment of the present invention, the plurality of transceivers 106-1 to 106-6 may perform only Radio Frequency (RF) processing of signals. For example, the plurality of transceivers 106-1 to 106-6 may perform band conversion, amplification, etc. of signals. In accordance with another exemplary embodiment of the present invention, the plurality of transceivers 106-1 to 106-6 may perform RF processing and may also perform Media Access Control (MAC) layer processing. In this case, the plurality of transceivers 106-1 to 106-6 may perform RF processing and may also perform modulation and demodulation of signals.

Each transceiver or adjacent transceivers among the plurality of transceivers 106-1 to 106-6 may configure one virtual cell. As shown in FIG. 1, the transceiver 106-1 is grouped as one group to configure a virtual cell 1 120-1, and the transceiver 106-2 and the transceiver 106-3 are grouped as one group to configure a virtual cell 120-2. The transceiver 106-4, the transceiver 106-5, and the transceiver 106-6 are grouped as one group to configure a virtual cell 120-3. It is determined whether any transceivers configure one virtual cell according to control of the center manager 102. Accordingly, the center manager 102 may change cell configuration dynamically in consideration of cell conditions, user distribution, etc. The virtual cell may be referred to as a "cluster". For example, the cluster denotes a service coverage unit configured by at least one transceiver set.

For example, the cell configuration, that is, the cluster configuration may be shown in FIGS. 2A to 2D.

FIGS. 2A to 2D illustrate cluster configuration examples in a wireless communication system according to an exemplary embodiment of the present invention.

FIGS. 2A to 2D illustrate different cluster configurations using 8 transceivers 204-1 to 204-8 included in a center manager 202.

Figure 2B:
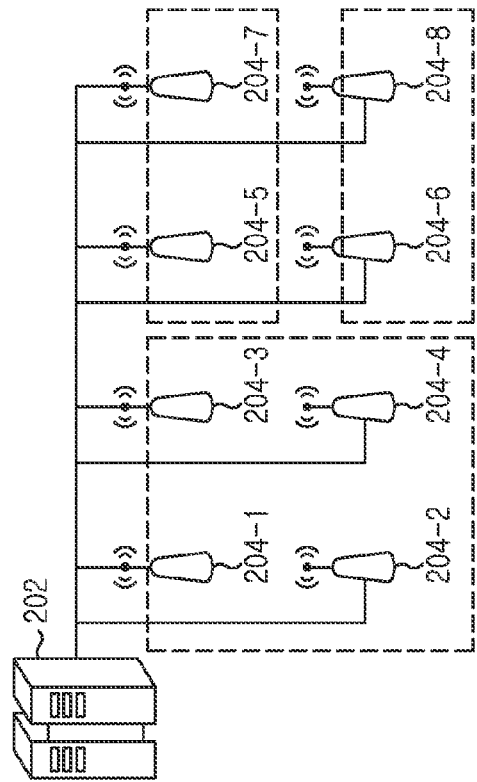
FIGS. 2A to 2D illustrate cluster configuration examples in a wireless communication system according to an exemplary embodiment of the present invention.
Figure 2D:
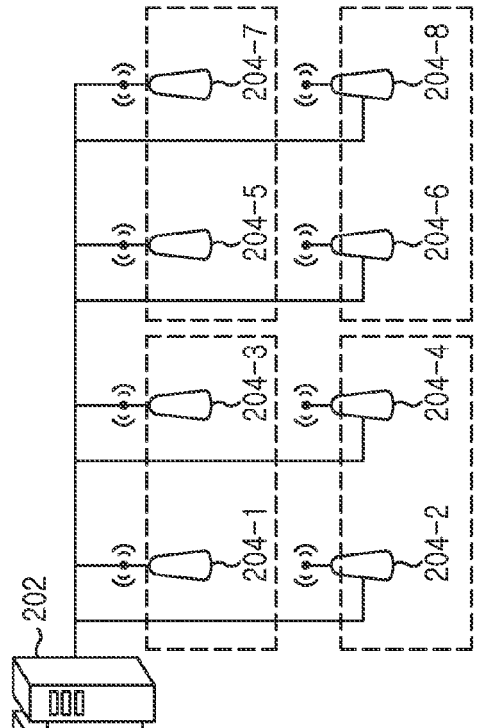
Figure 2A:
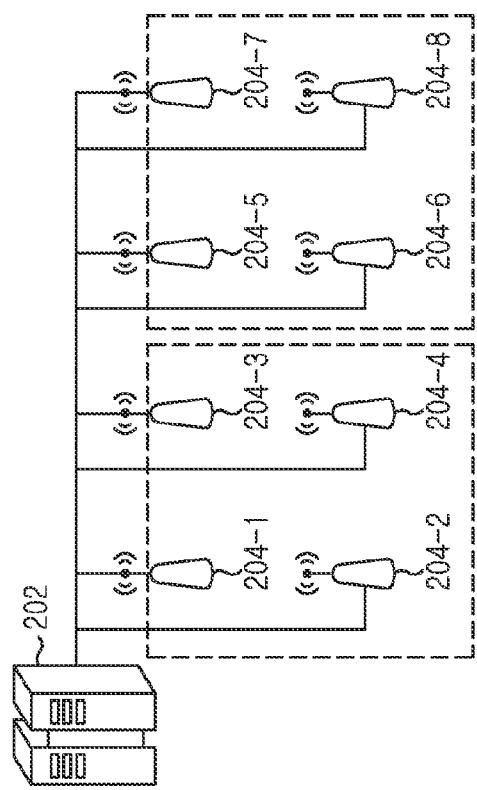
Figure 2C:
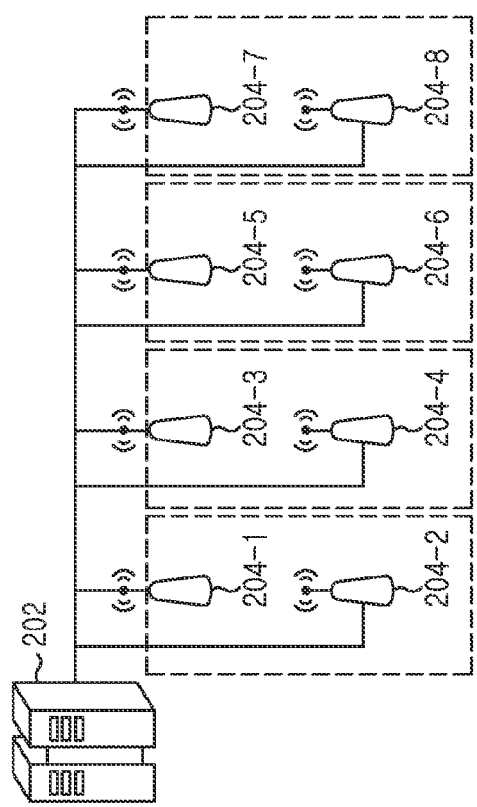

Referring to FIG. 2A, the 4 transceivers 204-1 to 204-4 may configure one cluster and the other 4 transceivers 204-5 to 204-8 may configure another cluster. As shown in FIG. 2B, the 4 transceivers 204-1 to 204-4 may configure one cluster, the 2 transceivers 204-5 to 204-7 may configure another cluster, and the 2 transceivers 204-6 to 204-8 may configure the other cluster. As shown in FIG. 2C, the 2 transceivers 204-1 and 204-2 may configure one cluster, the 2 transceivers 204-3 and 204-4 may configure another cluster, the 2 transceivers 204-5 and 204-6 may configure a third cluster, and the 2 transceivers 204-7 and 204-8 may configure the other cluster. As shown in FIG. 2D, the 2 transceivers 204-1 and 204-3 may configure one cluster, the 2 transceivers 204-5 and 204-7 may configure another cluster, the 2 transceivers 204-2 and 204-4 may configure a third cluster, and the 2 transceivers 204-6 and 204-8 may configure the other cluster.

Referring to FIGS. 2A to 2D, the wireless communication system according to an exemplary embodiment of the present invention may change a cluster configuration. The cluster configuration may also be changed during a system operation according to communication environments, user distribution, etc. In this case, reference signal configurations provided while being classified according to clusters must also be changed together. Hereinafter, for the convenience of description, the reference signal provided while being classified according to clusters is referred to as a "cluster-specific reference signal". The cluster-specific reference signal denotes a unique reference signal for a cluster and may be used for channel estimation for clusters, reference estimation for clusters, etc. A plurality of transceiver groups configuring a plurality of clusters transmit their own cluster-specific reference signals in a state where they are synchronized with one another. Accordingly, cluster-specific reference signals of different clusters must be orthogonalized with each other. Therefore, when a cluster configuration is changed, the configuration of a cluster-specific reference signal must be changed.

In accordance with an exemplary embodiment of the present invention, a process of configuring a cluster-specific reference signal is determined as follows. The process of configuring the cluster-specific reference signal includes a process of allocating a resource region for the cluster-specific reference signal, a process of setting a related parameter, and a process of updating a cluster-specific reference signal configuration according to a dynamic change of a cluster configuration.

For example, the resource region for the cluster-specific reference signal is shown in FIGS. 3A and 3B. Hereinafter, for the convenience of description, the resource region for the cluster-specific reference signal is referred to as a "cluster-specific reference signal region".

FIGS. 3A and 3B illustrate allocation examples of cluster-specific reference signal regions in a wireless communication system according to an exemplary embodiment of the present invention.

Referring to FIGS. 3A and 3B, the cluster-specific reference signal region may be allocated, as shown in FIG. 3A, to some symbols. The cluster-specific reference signal region may be allocated, as shown in FIG. 3B, to some subcarriers. In accordance with another exemplary embodiment of the present invention, the cluster-specific reference signal region may be allocated as a shape which is different from shapes shown in FIGS. 3A and 3B.

The cluster-specific reference signal region may be allocated to a channel through a cluster-specific reference signal that is transmitted. In this case, as shown in FIGS. 3A and 3B, the cluster-specific reference signal is transmitted together through the same channel. The cluster-specific reference signal denotes a unique reference signal for one transceiver. As shown in FIGS. 3A and 3B, when the cluster-specific reference signal is used, it is preferable that the cluster-specific reference signal region is allocated to be exclusive with resources occupied by the cluster-specific reference signal. The cluster-specific reference signal region may be broadcasted through a control message. For example, the control message may represent the cluster-specific reference signal region with a start resource position and an end resource position.

After the cluster-specific reference signal region is allocated, resources in the allocated region are distributed to a plurality of clusters. At this time, related parameters of the cluster-specific reference signal are set up. For example, the parameters may include at least one of an offset, a period, the number of clusters, and an index. The "offset" indicates a resource position where a reference signal is started, for example, a first mapped position. The "period" indicates an interval at which a reference signal of the same cluster is repeated. The "number of clusters" indicates the number of clusters which are managed by one center manager, for example, the number of clusters which share one cluster-specific reference signal region. The "index" is allocated to each cluster, and indicates the order of a reference signal of each cluster. For example, parameter setup examples are shown in FIGS. 4A and 4B and FIGS. 5A to 5C.

FIGS. 4A and 4B illustrate setup examples of cluster-specific reference signals according to reference signal density in a wire communication system according to an exemplary embodiment of the present invention.

FIGS. 4A and 4B illustrate configuration examples in which third symbols are allocated to a cluster-specific reference signal region and illustrate the configuration examples of cluster-specific reference signals defined by different density when 3 clusters are configured. Referring to FIG. 4A, the "offset" is set to 2, the "period" is set to 5, and the "number of clusters" is set to 3. Also, although it is not shown in FIGS. 4A and 4B, the "index" of a cluster 1 is set to 1, the "index" of a cluster 2 is set to 2, and the "index" of a cluster 3 is set to 3. Therefore, a reference signal of the cluster 1 in which the index is 1, a reference signal of the cluster 2 in which the index is 2, and a reference signal of the cluster 3 in which the index is 3 are successively mapped from a third subcarrier which is a subcarrier after a subcarrier by the offset (=2) among third symbols. A pattern of the reference signal is repeated at intervals of subcarriers by the period (=5). Referring to FIG. 4B, the "offset" is set to 4, the "period" is set to 8, and the "number of clusters" is set to 3. In comparison with FIGS. 4A and 4B, densities of reference signals differ on a frequency axis. For example, the densities of the reference signals may be changed by adjusting the "offset" and the "period".

FIGS. 5A to 5C illustrate setup examples of cluster-specific reference signals according to a number of clusters in a wireless communication system according to an exemplary embodiment of the present invention. FIGS. 5A to 5C illustrate configuration examples of cluster-specific reference signals defined to the number of different clusters when third symbols are allocated to a cluster-specific reference signal region. Referring to FIGS. 5A to 5C, settings of the "offset" and the "period" are equal with each other. However, settings of the "number of clusters" and the "index" differ from each other. For example, in the case of FIG. 5A, the "number of clusters" is 2, the "index" of a cluster 1 is 1, and the "index" of a cluster 2 is 2. In the case of FIG. 5B, the "number of clusters" is 3, the "index" of a cluster 1 is 1, the "index" of a cluster 2 is 2, and the "index" of a cluster 3 is 3. In the case of FIG. 5C, the "number of clusters" is 4, the "index" of a cluster 1 is 1, the "index" of a cluster 2 is 2, the "index" of a cluster 3 is 3, and the "index" of a cluster 4 is 4. For example, when a cluster configuration is dynamically changed, the wireless communication system may operate a cluster-specific reference signal suitable for the changed cluster configuration by changing parameters of the cluster-specific reference signal.

Figure 6:
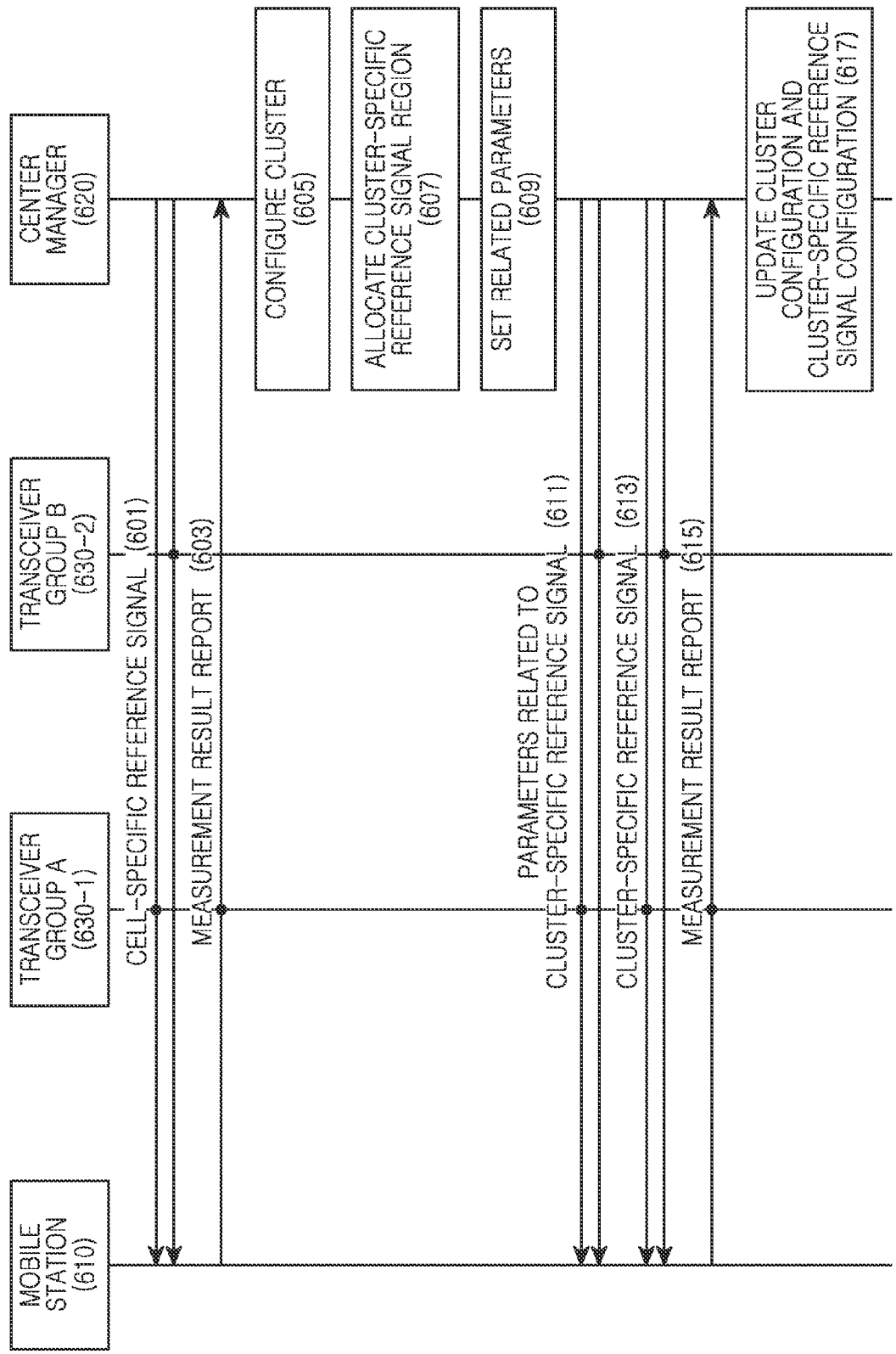
FIG. 6 is a signal sequence diagram illustrating a process of operating a cluster-specific reference signal in a wireless communication system according to an exemplary embodiment of the present invention.

FIG. 6 is a signal sequence diagram illustrating a process of operating a cluster-specific reference signal in a wireless communication system according to an exemplary embodiment of the present invention.

Referring to FIG. 6, the wireless communication system transmits and receives signals among a mobile station 610, a center manager 620, a transceiver group A 630-1, and a transceiver group B 630-2. It is assumed that the mobile station 610 is located in a cluster of the transceiver group A 630-1. Each of the transceiver group 630-1 and the transceiver group B 630-2 configures one cluster and includes at least one transceiver.

Referring to FIG. 6, in step 601, the center manager 620 transmits a cell-specific reference signal through the transceiver group A 630-1 and the transceiver B 630-2. The cell-specific reference signal is a unique reference signal for a transceiver. Cell-specific reference signals between transceivers which belong to the transceiver group A 630-1 may be different from each other. For example, cell-specific reference signals of the different transceivers may differ in at least one aspect of a sequence, a signal value, and a resource position.

In step 603, the mobile station 610 receives the cell-specific reference signals, measures channel quality for each of the cell-specific reference signals, and transmits the channel quality measurement result to the center manager 620 through at least one transceiver which belongs to the transceiver group A 630-1. The channel quality measurement result includes channel quality values for transceivers.

In step 605, the center manager 620 configures a cluster. For example, the center manager 620 determines a cluster configuration using the channel quality measurement result for the cell-specific reference signal received from the mobile station 610. The center manager 620 may consider a channel quality value, user distribution, etc. for each transceiver.

In step 607, the center manager 620 allocates a cell-specific reference signal region. For example, the cell-specific reference signal region may be allocated to at least one specific symbol or at least one specific subcarrier. Also, the cell-specific reference signal region may be allocated to a channel through which the cell-specific reference signal is transmitted. In this case, the center manager 620 allocates the cluster-specific reference signal region to be exclusive with resources occupied by the cell-specific reference signal.

In step 609, the center manager 620 sets parameters related to the cluster-specific reference signal. For example, the parameters include at least one of an offset, a period, the number of clusters, and an index. The offset indicates a resource position where a reference signal is started and the period indicates an interval at which a reference signal of the same cluster is repeated. The number of clusters indicates the number of clusters which are managed by the center manager 620 and the index indicates the order of a reference signal allocated to each cluster.

In step 611, the center manager 620 transmits the parameters related to the cluster-specific reference signal to the mobile station 610 through the transceiver group A 630-1 and the transceiver group B 630-2. Accordingly, the mobile station 610 may determine a cluster-specific reference signal configuration of each cluster. For example, the mobile station 610 may identify a cluster-specific reference signal of each cluster.

In step 613, the center manager 620 transmits a cluster-specific reference signal of a cluster of the transceiver group A 630-1 through the transceiver group A 630-1 and transmits a cluster-specific reference signal of a cluster of the transceiver group B 630-2 through the transceiver group B 630-2. Herein, because the mobile station 610 is located in the cluster of the transceiver group A 630-1, the mobile station 610 may receive the cluster-specific reference signal of the transceiver group A 630-1. However, the mobile station 610 may not receive the cluster-specific reference signal of the transceiver group B 630-2. Herein, when the mobile station 610 receives interference from a signal of the transceiver group B 630-2, mobile station 610 may receive the cluster-specific reference signal of the transceiver group B 630-2.

In step 615, the mobile station 610 measures a channel quality for the cluster-specific reference signal and transmits the channel quality measurement result to the center manager 620 through at least one transceiver which belongs to the transceiver group A 630-1. Herein, the channel quality measurement result includes channel quality values for clusters to differ from the channel quality measurement result transmitted in step 603.

In step 617, the center manager 620 updates at least one of a cluster configuration and a cluster-specific reference signal configuration using a channel quality measurement result report from the mobile station 610. In accordance with another exemplary embodiment of the present invention, the center manager 620 may not perform the process of step 617. For example, the center manager 620 may determine whether to change the cluster configuration based on the channel quality measurement result report. When it is necessary to change the cluster configuration as a result of the determination, the center manager 620 updates the cluster configuration. When the cluster configuration is updated, the cluster-specific reference signal configuration may also be updated.

As described above, the wireless communication system according to an exemplary embodiment of the present invention operates a cluster-specific reference signal. As shown in step 617 of FIG. 6, to change the cluster configuration according to channel quality using the cluster-specific reference signal is a use example of the cluster-specific reference signal. In addition, the present disclosure provides various use examples for the cluster-specific reference signal. In a case of one use example, the wireless communication system according to an exemplary embodiment of the present invention may perform interference control using the cluster-specific reference signal. In a case of another use example, the wireless communication system according to another exemplary embodiment of the present invention may change a cluster configuration dynamically using the cluster-specific reference signal.

Figure 7A:
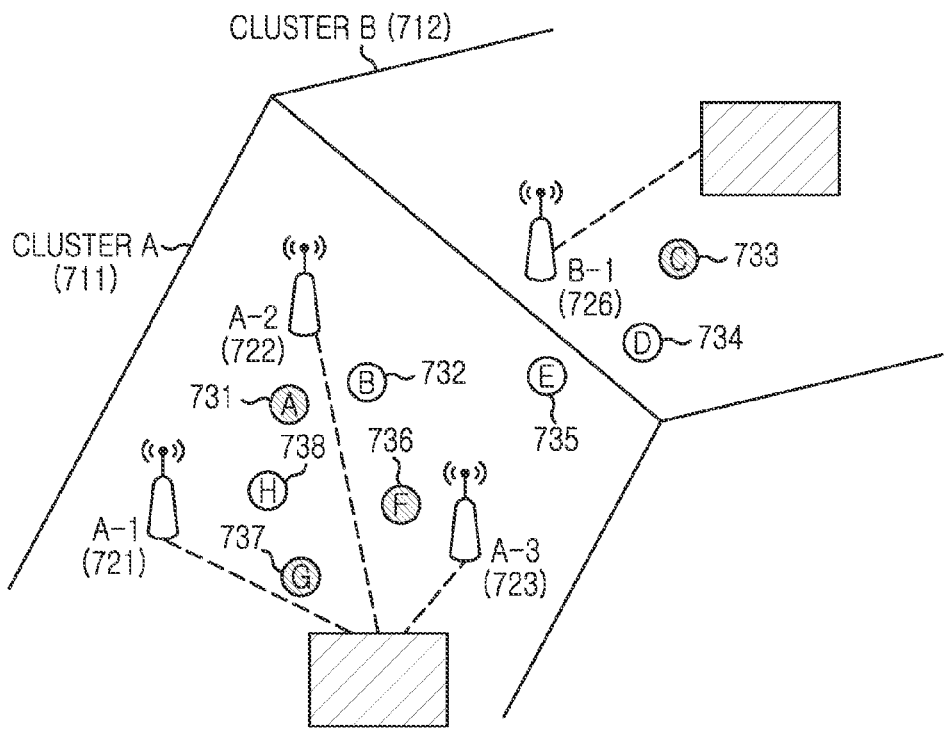
FIGS. 7A and 7B illustrate use examples of cluster-specific reference signals in a wireless communication system according to an exemplary embodiment of the present invention.
Figure 7B:
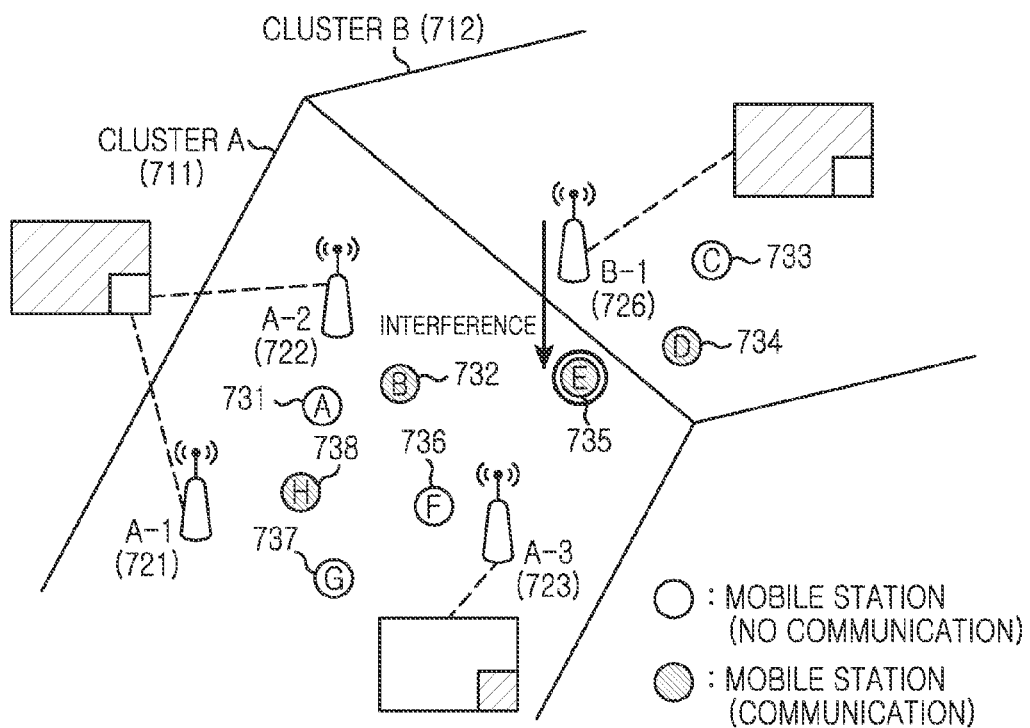

FIGS. 7A and 7B illustrate use examples of cluster-specific reference signals in a wireless communication system according to an exemplary embodiment of the present invention. FIGS. 7A and 7B illustrate interference control using a cluster-specific reference signal.

Referring to FIGS. 7A and 7B, a cluster A 711 includes a transceiver A-1 721, a transceiver A-2 722, and a transceiver A-3 723. The cluster B 712 includes a transceiver B-1 726. FIGS. 7A and 7B illustrate different scheduling time points. Herein, the scheduling time point denotes a time point when resource allocation is performed to at least one specific target. For example, as shown in FIG. 7A, scheduling time points are scheduling time points of a mobile station A 731, a mobile station C 733, a mobile station F 736, and a mobile station G 737 and denote time points for allocating resources to only the mobile station A 731, the mobile station C 733, the mobile station F 736, and the mobile station G 737. Also, as shown in FIG. 7B, scheduling time points are scheduling time points of a mobile station B 732, a mobile station D 734, a mobile station E 735, and a mobile station H 738, and denote time points for allocating resources to only the mobile station B 732, the mobile station D 734, the mobile station E 735, and the mobile station H 738.

In the case of FIG. 7A, the mobile station A 731, the mobile station F 736, and the mobile station G 737 which are located in the cluster A 711 do not receive interference from a neighboring cluster, for example, the cluster B 712. Also, the mobile station C 733 which is located in the cluster B 712 does not receive interference from a neighboring cluster, for example, the cluster A 711. A center manager (not shown) which controls the transceivers 721 to 723 and 726 may determine the above-described interference conditions using a channel quality measurement result measured using cluster-specific reference signals by the mobile stations 731 to 738. In the same time point as a time point of FIG. 7A, because there is no interference between the cluster A 711 and the cluster B 712, the center manager allocates, as shown in FIG. 7A, resources such that the transceivers 721 to 723 and 726 use all resources in a frame. For example, the center manager equally controls a range of resources capable of being allocated to the mobile station A 731, the mobile station C 733, the mobile station F 736, and the mobile station G 737.

In the case of FIG. 7B, the mobile station B 732 and the mobile station H 736 which are located in the cluster A 711 do not receive interference from a neighboring cluster, for example, the cluster B 712. However, the mobile station E 735 receives interference from the transceiver B-1 726 which belongs to the cluster B 712. For example, a signal transmitted to the mobile station D 734 by the transceiver B-1 726 which belongs to the cluster B 712 operates as interference to the mobile station E 735. The center manager which controls the transceivers 721 to 723 and 726 may determine the above-described interference conditions using the channel quality measurement result measured using the cluster-specific reference signal by the mobile stations 731 to 738. In the same time point as a time point of FIG. 7B, because the mobile station E 735 receives interference from the transceiver B-1 726 which belongs to the cluster B 712, the center manager divides, as shown in FIG. 7B, resources in a frame into first and second regions. The center manager performs a control operation such that the transceiver A-1 721 and the transceiver A-2 722 communicate with the mobile station B 732 and the mobile station H 738 through the first region. The center manager performs a control operation such that the transceiver B-1 726 communicates with the mobile station D 734 through the first region. The center manager performs a control operation such that the transceiver A-3 723 communicates with the mobile station E 735 through the second region. For this reason, because resources allocated to the mobile station D 734 and the mobile station E 735 are mutually exclusive, interference received at the mobile station D 734 may be removed.

In accordance with another exemplary embodiment of the present invention, the center manger does not limit a range of resources used by the transceivers 721 to 723 and 726, and may set a resource range capable of being allocated to the mobile station E 726 and a resource range of being allocated to the other mobile stations 732, 734, and 738 to be different from each other. In this case, because resources allocated to the mobile station D 734 and the mobile station E 735 are mutually exclusive, interference received at the mobile station D 734 may be removed.

In accordance with another exemplary embodiment of the present invention, the center manger may perform a control operation such that the transceiver B-726 does not transmit a signal to the mobile station D 734 in a time point when the mobile station E 735 performs communication. Herein, in this case, because it is excessively unfavorable for the mobile station D 734, in accordance with another exemplary embodiment of the present invention, the center manager may perform a control operation such that the transceiver B-1 726 randomly determines whether to transmit a signal to the mobile station D 734 in a time point when the mobile station E 735 performs communication. For example, to randomly determine whether to transmit the signal to the mobile station D 734 is to generate a random number and determine whether to transmit the signal to the mobile station D 734 according to whether the random number satisfies a certain condition.

In accordance with another exemplary embodiment of the present invention, when the transceiver A-3 723 interferes with the mobile station D 734, the center manager may compare a degree of interference which is received in the mobile station D 724 by the transceiver A-3 723 with a degree of interference which is received in the mobile station E 735 by the transceiver B-1 726 and may perform a control operation such that a transceiver which causes a relatively high interference degree does not use the second region. For example, the interference degree may be one of interference power and a ratio of interference power to a data rate.

FIG. 8 is a signal sequence diagram illustrating use examples of cluster-specific reference signals in a wireless communication system according to an exemplary embodiment of the present invention. FIG. 8 illustrates a signal sequence diagram for interference control shown in FIG. 7.

Referring to FIG. 8, the wireless communication system transmits and receives signals among a mobile station 810, a center manager 820, a transceiver group A 830-1, and a transceiver group B 830-2. It is assumed that the mobile station 810 is located in a cluster of the transceiver group A 830-1. Each of the transceiver group A 830-1 and the transceiver group B 830-2 configures one cluster and includes at least one transceiver.

Referring to FIG. 8, in step 801, the center manager 820 transmits reference signals through the transceiver group A 830-1 and the transceiver group B 830-2. The reference signals include at least one of a cell-specific reference signal and a cluster-specific reference signal. The cell-specific reference signal is a unique reference signal for a transceiver and the cluster-specific reference signal is a unique reference signal for a cluster.

In step 803, the mobile station 810 measures inter-cluster interference using the reference signal. For example, the mobile station 810 attempts to detect a reference signal of a cluster to which the mobile station 810 belongs and a reference signal of a neighboring cluster, and measures a channel gain. Herein, the channel gain includes a Received Signal Strength Indication (RSSI), received signal power, a channel response value, a channel response magnitude, etc. Also, the mobile station 810 may calculate a channel gain ratio of the cluster to which the mobile station 810 belongs to a neighboring cluster with respect to at least one neighboring cluster. The channel gain ratio may be defined as one of a Carrier and Interference Ratio (CIR), a Carrier and Interference and Noise Ratio (CINR), a Signal and Interference Ratio (SIR), and a Signal and Interference and Noise Ratio (SINR).

In step 805, the mobile station 810 transmits the interference measurement result to the center manager 820 through at least one transceiver which belongs to the transceiver group A 830-1. Herein, the interference measurement result includes at least one of an index of the cluster to which the mobile station 810 belongs, the channel gain measured by the mobile station 810, and the channel gain ratio.

In step 807, the center manager 820 which receives interference measurement information from the mobile station 810 and at least another mobile station performs user classification and cluster-based resource allocation. In more detail, the center manager 820 classifies mobile stations which receive interference from a neighboring cluster and mobile stations which do not receive interference from the neighboring cluster. The center manager 820 defines an exclusive resource range between clusters in consideration of the mobile stations which receive the interference and allocates resources in the defined resource range. Herein, the exclusive resource range may be changed according to a transmission time point and a scheduling time point. For example, the center manager 820 allocates resources to a mobile station which receives interference in a partial range or a transceiver which communicates with the mobile station which receives the inference among all resources. The center manager 820 allocates resources to another mobile station in the same cluster in the other range except for the partial range or a transceiver which communicates with the another mobile station. The center manager 820 allocates resources to a mobile station in a cluster which provides the interference in the other range or a transceiver in the cluster which provides the interference.

In step 809, the center manager 820 transmits a message for informing the resource allocation result to a plurality of mobile stations including the mobile station 810 through the transceiver group A 830-1 and the transceiver group B 830-2. For example, the message includes at least one of a cluster index, a range of resources capable of being allocated to a mobile station which receives interference, identification information of a mobile station which receives interference, and a range of resources capable of being allocated to a mobile station which does not receive interference. Herein, the message may include a resource allocation result of all mobile stations without classifying clusters. Or, the message may be generated while being classified according to clusters. In this case, a message transmitted through the transceiver group A 830-1 and a message transmitted through the transceiver group B 830-2 may include different information. Because the mobile station 810 is located in a cluster of the transceiver group A 830-1, the mobile station 810 may receive the message transmitted through the transceiver group A 830-1. However, the mobile station 810 may not receive the message transmitted through the transceiver group B 830-2.

In step 811, the mobile station 810 transmits and receives signals with the transceiver group A 830-1 through the allocated resources. Although it is not shown in FIG. 8, a signal received from the mobile station 810 to the transceiver group A 830-1 is provided to the center manager 820. A signal to be transmitted from the transceiver group A 8301-1 to the mobile station 810 is provided from the center manager 820.

Figure 9A:
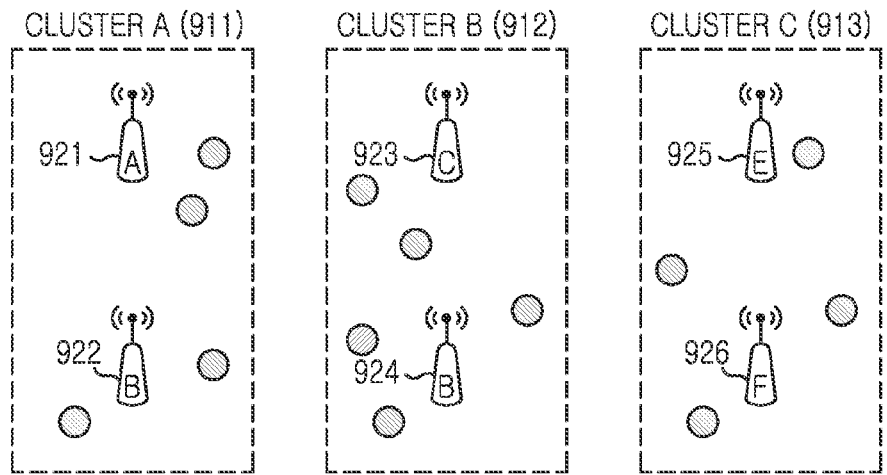
FIGS. 9A to 9C illustrate other use examples of cluster-specific reference signals in a wireless communication system according to an exemplary embodiment of the present invention.
Figure 9B:
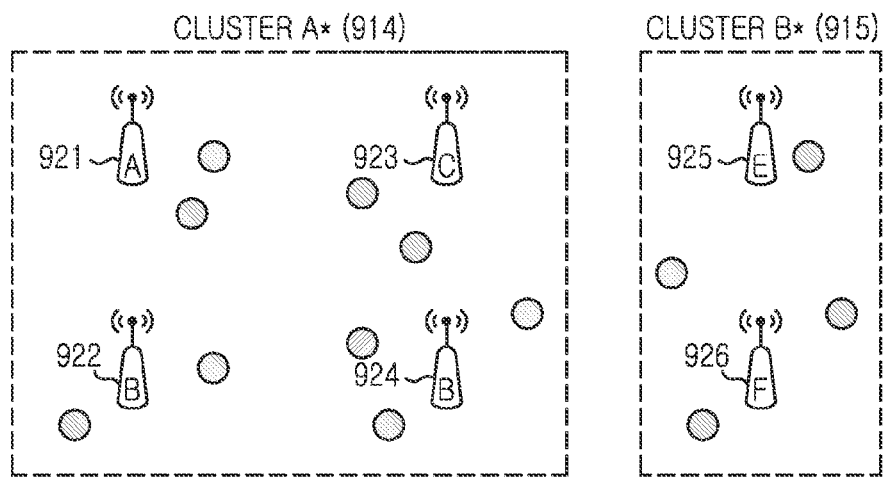
Figure 9C:
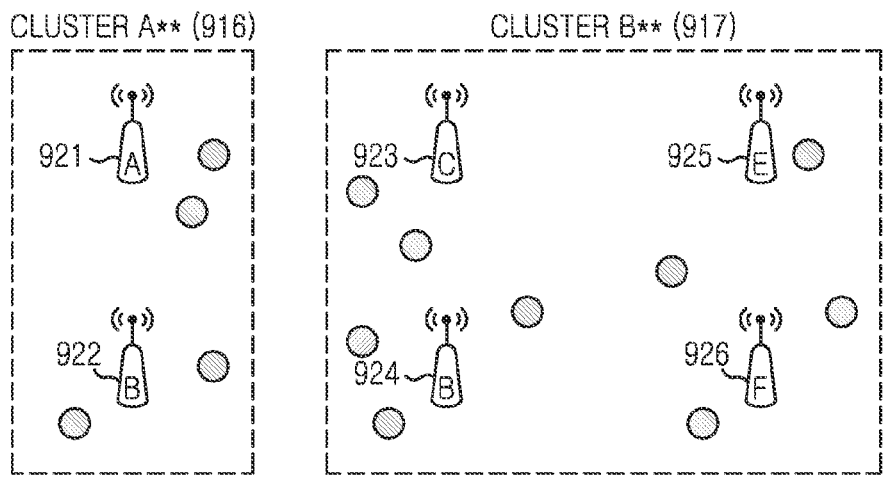

FIGS. 9A to 9C illustrate other use examples of cluster-specific reference signals in a wireless communication system according to an exemplary embodiment of the present invention. FIGS. 9A to 9C illustrate a cluster configuration for optimizing average communication quality of all users using a cluster-specific reference signal.

FIG. 9A illustrates a current cluster configuration for provided user distribution. FIGS. 9B and 9C illustrate 2 different cluster configurations capable of being expanded from a current cluster configuration.

Considering the current cluster configuration, as shown in FIG. 9A, a transceiver A 921 and a transceiver B 922 configure a cluster A 911. A transceiver C 923 and a transceiver D 924 configure a cluster B 912 and a transceiver E 925 and a transceiver F 926 configure a cluster C 913. Considering one of the expanded cluster configurations, as shown in FIG. 9B, the cluster A 911 and the cluster B 912 configure a new cluster A* 914 by being combined. The cluster C 913 configures a new cluster B* 915. Considering another of the expanded cluster configurations, as shown in FIG. 9C, the cluster A 911 configures a new cluster A 916. The cluster B 912 and the cluster C 913 configure a new cluster B 917 by being combined.

In order to determine a suitable cluster change between cluster changes shown in FIGS. 9B and 9C, when a center manager which controls the transceivers 921 to 926 changes the current cluster configuration shown in FIG. 9A to the expanded cluster configuration shown in FIG. 9B based a channel quality measurement result measured using cluster-specific reference signals by mobile stations and when the center manager changes the current cluster configuration to the expanded cluster configuration shown in FIG. 9C based on the channel quality measurement result, the center manager determines an average channel quality change of all users. After the determination, the center manager changes the current cluster configuration to a relatively excellent cluster configuration in an aspect of average channel quality of all users. At this time, a channel quality change before and after the current cluster configuration is changed may be calculated as follows.

A mobile station may obtain the maximum channel quality when all transceivers in a cluster to which the mobile station belongs transmit signals. When all the clusters in the cluster transmit signals, the channel quality undergone at the mobile station is shown in Equation (1) below. In Equation (1) below, the channel quality is illustrated by an SINR as an example.

$$SINR_u^{Si} = \frac{\sum_{s \in Si} |h_{s,u}|^2 P}{\sum_{s \in S/Si} |h_{s,u}|^2 P + N_0}$$

$$= \frac{\sum_{s \in Si} |h_{s,u}|^2 P}{I_u - \sum_{s \in Si} |h_{s,u}|^2 P}$$

Equation (1)

In Equation (1), $SINR_u^{Si}$ denotes an SINR undergone by a mobile station u when all transceivers in a cluster i transmit signals, and Si denotes all transceiver sets in the cluster i. s denotes a transceiver index, and $h_{s,u}$ denotes a channel gain between a transceiver s and the mobile station u. P denotes transmission power of a transceiver, and S denotes all transceiver sets. $N_0$ denotes noise power, and $I_u$ denotes the total signal strength to the mobile station u.

When two clusters are combined into one cluster, an SINR capable of being obtained when all transceivers in the two clusters transmit signals is shown in Equation (2) below.

$$SINR_u^{SiUSj} = \frac{\sum_{s \in SiUSj} |h_{s,u}|^2 P}{\sum_{s \in S/(SiUSj)} |h_{s,u}|^2 P + N_0}$$

$$= \frac{\sum_{s \in SiUSj} |h_{s,u}|^2 P}{I_u - \sum_{s \in SiUSj} |h_{s,u}|^2 P}$$

Equation (2)

In Equation (2), $SINR_u^{SiUSj}$ denotes an SINR undergone by a mobile station u when all transceivers in a cluster i and a cluster j transmit signals, and SiUSj denotes all transceiver sets in the cluster i and the cluster j. s denotes a transceiver index, and $h_{s,u}$ denotes a channel gain between a transceiver s and the mobile station u. P denotes transmission power of a transceiver, and S denotes all transceiver sets. $N_0$ denotes noise power, and $I_u$ denotes the total signal strength to the mobile station u.

A transfer rate change when the two clusters are combined into the one cluster using Equation (1) and Equation (2) is shown in Equation (3) below.

$$f_u^{SiUSj} = \log_2(1 + SINR_u^{SiUSj}) - \log_2(1 + SINR_u^{Si})$$

$$= \log_2\left(\frac{1 + SINR_u^{SiUSj}}{1 + SINR_u^{Si}}\right)$$

$$\approx \log_2\left(\frac{SINR_u^{SiUSj}}{SINR_u^{Si}}\right)$$

Equation (3)

In Equation (3), $f_u^{SiUSj}$ denotes an amount of a transfer rate change, and $SINR_u^{SiUSj}$ denotes an SINR undergone by a mobile station u when all transceivers in a cluster i and a cluster j transmit signals. $SINR_u^{Si}$ denotes an SINR undergone by the mobile station u when all transceivers in the cluster i transmit signals.

In Equation (3), the SINR may be defined as shown in Equation (4) below.

$$\beta_u^{SiUSj} = \frac{SINR_u^{SiUSj}}{SINR_u^{Si}}$$

$$= \frac{\sum_{s \in SiUSj} |h_{s,u}|^2 P}{\sum_{s \in Si} |h_{s,u}|^2 P} \cdot \frac{I_u - \sum_{s \in Si} |h_{s,u}|^2 P}{I_u - \sum_{s \in SiUSj} |h_{s,u}|^2 P}$$

$$= \left(1 + \frac{\sum_{s \in Si} |h_{s,u}|^2}{\sum_{s \in Si} |h_{s,u}|^2}\right) \cdot \left(1 - \frac{\sum_{s \in Si} |h_{s,u}|^2}{I_u/P - \sum_{s \in Si} |h_{s,u}|^2}\right)^{-1}$$

$$= (1 + SIR^{-1}) \cdot (1 - IINR)^{-1}$$

Equation (4)

In Equation (4), $\beta_u^{SiUSj}$ denotes a ratio of SINRs for a mobile station u before and after a cluster i and a cluster j are combined, and $SINR_u^{SiUSj}$ denotes an SINR undergone by the mobile station u when all transceivers in the cluster i and the cluster j transmit signals. $SINR_u^{Si}$ denotes an SINR undergone by the mobile station u when all transceivers in the cluster i transmit signals, and SiUSj denotes all transceiver sets in the cluster i and the cluster j. s denotes a transceiver index, and $h_{s,u}$ denotes a channel gain between a transceiver s and the mobile station u. P denotes transmission power of a transceiver, and $I_u$ denotes the total signal strength to the mobile station u. SIR denotes a signal to interference ratio, and IIRN denotes an interference to other-interference-plus-noise ratio.

Referring to Equation (3) and Equation (4), if an SIR and an IINR of a specific mobile station may be calculated, an amount of transfer rate changes of the specific mobile station before and after two clusters are combined may be calculated. The SIR and the IINR may be measured using a cluster-specific reference signal according to an exemplary embodiment of the present invention. For example, the mobile station may measure channel gains for clusters using a cluster-specific reference signal and may calculate the SIR and the IINR using the channel gains for clusters. As shown in Equation (5) below, the entire amount of transfer rate changes is calculated by adding an amount of transfer rate changes of a plurality of mobile stations in a cluster.

$$f^{SiUSj} = \sum_{u \in Ui} f_u^{SiUSj}$$

$$= \sum_{u \in Ui} \log_2 \beta_u^{SiUSj}$$

$$= \log_2\left(\prod_{u \in Ui} \beta_u^{SiUSj}\right)$$

Equation (5)

In Equation (5), $f^{SiUSj}$ denotes an amount of the entire transfer rate change, and $f_u^{SiUSj}$ denotes an amount of a transfer rate change of a mobile station u. u denotes a mobile station index, and $U_i$ denotes a mobile station set which belongs to a cluster i. $\beta_u^{SiUSj}$ denotes a ratio of SINRs for the mobile station u before and after the cluster i and a cluster j are combined.

In order to simplify computation, the wireless communication system according to an exemplary embodiment of the present invention may use not an amount of a transfer rate change itself but multiplication of a radio of SINRs as a determination metric for combination. The determination metric for combination is shown in Equation (6).

$$\alpha^{SiUSj} = \prod_{u \in Ui} \beta_u^{SiUSj} \quad \text{Equation (6)}$$

In Equation (6), $\alpha^{SiUSj}$ denotes a determination metric for combination, and u denotes a mobile station index. $U_i$ denotes a mobile station set which belongs to a cluster i, and $\beta_u^{SiUSj}$ denotes a ratio of SINRs for a mobile station u before and after the cluster i and a cluster j are combined.

In sum, a center manager defines one initial transceiver as one cluster. Mobile stations select a transceiver having the lowest path loss as a serving cluster. The center manager transmits a cluster-specific reference signal through transceivers. The mobile stations measure channel gains for clusters, presuppose that an adjacent cluster and a serving cluster are combined, and calculate and report SIRs and IINRs. Accordingly, the center manager calculates a determination metric for combination shown in Equation (6) with respect to each cluster combination and combines clusters of a combination having the maximum determination metric into one cluster. After the above-described process is repeatedly performed, when the number of clusters reaches the number of acceptable clusters or when there is no longer any profit for the cluster combination, the center manager determines a corresponding state as a completed cluster configuration. For example, when the maximum determination metric is less than or equal to a threshold value, the center manager may determine that there is no profit for the cluster combination.

Figure 10:
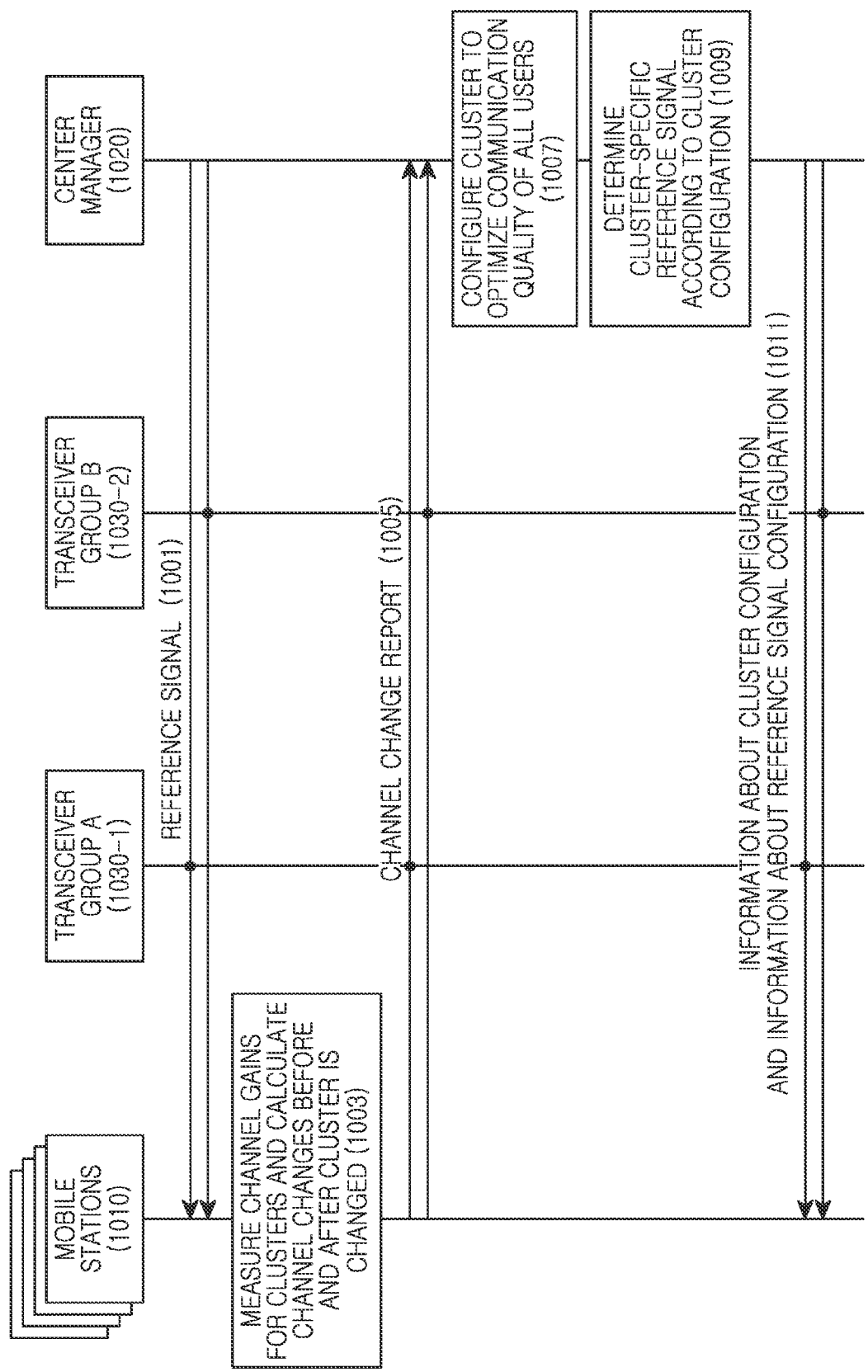
FIG. 10 is a signal sequence diagram illustrating other use examples of cluster-specific reference signals in a wireless communication system according to an exemplary embodiment of the present invention.

FIG. 10 is a signal sequence diagram illustrating other use examples of cluster-specific reference signals in a wireless communication system according to an exemplary embodiment of the present invention. FIG. 10 illustrates a signal sequence diagram for a dynamic cluster configuration shown in FIG. 9.

Referring to FIG. 10, the wireless communication system transmits and receives signals among mobile stations 1010, a center manager 1020, a transceiver group A 1030-1, and a transceiver group B 1030-2. Each of the transceiver group A 1030-1 and the transceiver group B 1030-2 configures one cluster and includes at least one transceiver.

Referring to FIG. 10, in step 1001, the center manager 1020 transmits reference signals through the transceiver group A 1030-1 and the transceiver group B 1030-2. The reference signals include at least one of a cell-specific reference signal and a cluster-specific reference signal. The cell-specific reference signal is a unique reference signal for a transceiver and the cluster-specific reference signal is a unique reference signal for a cluster.

In step 1003, the mobile stations 1010 measure channel gains for clusters using the reference signal. For example, the mobile stations 1010 attempts to detect a reference signal of a cluster to which they belong and a reference signal of a neighboring cluster, and measures channel gains. Herein, the channel gain includes an RSSI, received signal power, etc. The mobile stations 1010 calculate an amount of channel changes before and after a cluster is changed. For example, an amount of the channel change includes at least one of an SIR and an IINR.

In step 1005, the mobile stations 1010 transmit an amount of the channel changes to the center manager 1020 through the transceiver group A 1030-1 and the transceiver group B 1030-2. In accordance with another exemplary embodiment of the present invention, the mobile stations 1010 may transmit the channel gains for clusters instead of an amount of the channel changes.

In step 1007, the center manager 1020 configures a cluster to maximize communication quality of all users using an amount of the channel changes received from the mobile stations 1010. The communication quality includes at least one of a transfer rate and channel quality. In more detail, the center manager 1020 calculates a determination metric for combination with respect to each cluster combination and determines that clusters of a combination having the maximum determination metric are combined into one cluster. For example, the determination metric is a value indicating a profit for a cluster combination and may be defined as shown in Equation (6).

In step 1009, the center manager 1020 determines a cluster-specific reference signal configuration according to a cluster configuration. In more detail, the center manager 1020 allocates a cluster-specific reference signal region and sets parameters related to the cluster-specific reference signal. For example, the parameters include at least one of an offset, a period, the number of clusters, and an index. The offset indicates a resource position where a reference signal is started. The period indicates an interval at which a reference signal of the same cluster is repeated. The number of clusters indicates the number of clusters which are managed by the center manager 1020. The index indicates the order of a reference signal allocated to each cluster.

In step 1011, the center manager 1020 transmits information about a cluster configuration and information about a reference signal configuration to the mobile stations 1010 through the transceiver group A 1030-1 and the transceiver group B 1030-2. The information about the cluster configuration may include at least one of the number of clusters, an index of each cluster, and an index of a transceiver which belongs to each cluster. The information about the reference signal configuration may include at least one of the cluster-specific reference signal region, an offset, a period, the number of clusters, and an index of a corresponding cluster. The information about the reference signal configuration may include other information according to a cluster.

In an exemplary embodiment of the present invention shown in FIG. 10, the processes of steps 1001 to 1011 may be repeatedly performed. While the processes of steps 1001 to 1011 are repeatedly performed, when the number of clusters reaches the number of acceptable clusters or when there is no longer any profit for a cluster combination, the center manager 1020 determines a corresponding state as a completed cluster configuration. For example, when the maximum determination metric is less than or equal to a threshold value, the center manager 1020 may determine that there is no profit for the cluster combination.

Figure 11:
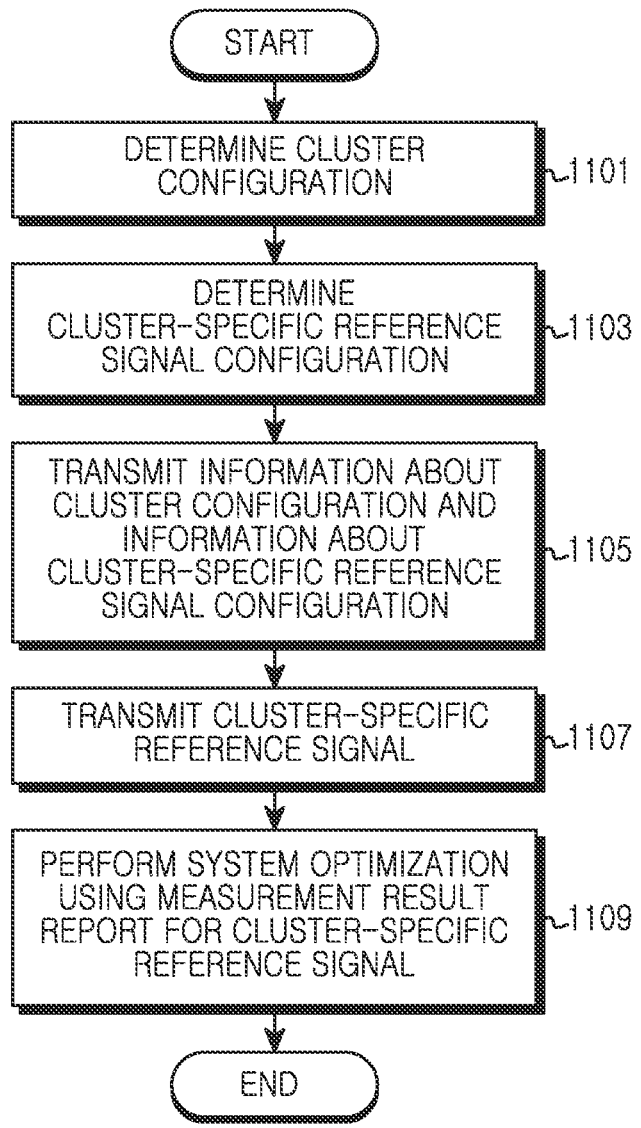
FIG. 11 is a flowchart illustrating an operation process of a base station in a wireless communication system according to an exemplary embodiment of the present invention.

FIG. 11 is a flowchart illustrating an operation process of a base station in a wireless communication system according to an exemplary embodiment of the present invention.

Referring to FIG. 11, the base station determines a cluster configuration in step 1101. For example, the base station may define each of transceivers as one cluster. Although it is not shown in FIG. 11, the base station may receive a measurement result report for a reference signal from mobile stations before determining the cluster configuration. In this case, the base station may configure a cluster including a plurality of transceivers. For example, the base station may determine, as described with reference to FIGS. 9 and 10, the cluster configuration.

The base station proceeds to step 1103 and determines a cluster-specific reference signal configuration according to the cluster configuration. The cluster-specific reference signal configuration may be changed according to the number of clusters, reference signal density, etc. In more detail, the base station allocates a cluster-specific reference signal region. For example, the cluster-specific reference signal region may be allocated as shown in FIG. 3. The base station sets parameters related to the cluster-specific reference signal. For example, the parameters include at least one of an offset, a period, the number of clusters, and indexes of clusters. The offset indicates a resource position where a reference signal is started. The period indicates an interval at which a reference signal of the same cluster is repeated. The number of clusters indicates the number of clusters which are configured by the base station. The index indicates the order of a reference signal allocated to each cluster.

The base station proceeds to step 1105 and transmits information about the cluster configuration and information about the cluster-specific reference signal configuration to mobile stations. The information about the cluster configuration and the information about the cluster-specific reference signal configuration may be transmitted through a broadcasting channel. The information about the cluster configuration may include at least one of the number of clusters, an index of each cluster, and an index of a transceiver which belongs to each cluster. The information about the reference signal configuration may include at least one of the cluster-specific reference signal region, an offset, a period, the number of clusters, and an index of a corresponding cluster. The information about the reference signal configuration may include other information according to a cluster. Herein, although at least one of the cluster configuration and the cluster-specific reference signal configuration is not changed in steps 1101 and 1103, information about the configuration which is not changed may not be transmitted.

The base station proceeds to step 1107 and transmits a cluster-specific reference signal. For example, the base station transmits the cluster-specific reference signal according to the cluster-specific reference signal configuration determined in step 1103. At this time, the base station transmits its own cluster-specific reference signals in a state where a plurality of transceivers are synchronized. In more detail, the base station transmits a cluster-specific reference signal of an nth cluster through at least one transceiver which belongs to the nth cluster in a position indicated by an index of the nth cluster from a position indicated by the offset, a cluster-specific reference signal region. At this time, the reference signal is repeatedly mapped by an interval indicated by the period.

The base station proceeds to step 1109 and performs system optimization using a measurement result report for the cluster-specific reference signal. The measurement result report includes channel gains for clusters measured by mobile stations which receive the cluster-specific reference signal or a value determined from the channel gain. For example, the measurement result report may include at least one of channel gains for clusters, channel quality, interference information, an SIR, and an IINR. The system optimization includes a cluster configuration change, a cluster-specific reference signal configuration change, interference control, etc. For example, as described with reference to FIGS. 7 and 8, the base station performs interference control, or as described with reference to FIGS. 9 and 10, the base station may change a cluster configuration.

Figure 12:
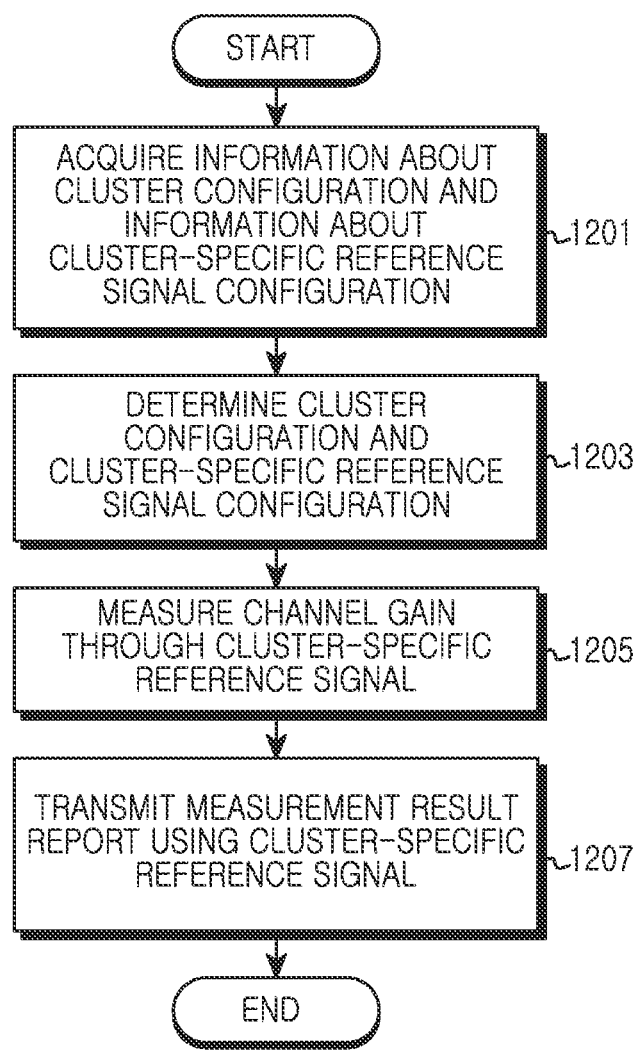
FIG. 12 is a flowchart illustrating an operation process of a mobile station in a wireless communication system according to an exemplary embodiment of the present invention.

FIG. 12 is a flowchart illustrating an operation process of a mobile station in a wireless communication system according to an exemplary embodiment of the present invention.

Referring to FIG. 12, the mobile station acquires information about a cluster configuration and information about a cluster-specific reference signal configuration in step 1201. For example, the information about the cluster configuration and the information about the reference signal configuration may be received through a broadcasting channel. The information about the cluster configuration may include at least one of the number of clusters, an index of each cluster, and an index of a transceiver which belongs to each cluster. The information about the reference signal configuration may include at least one of the cluster-specific reference signal region, an offset, a period, the number of clusters, and an index of a corresponding cluster. The information about the reference signal configuration may include other information according to a cluster.

The mobile station proceeds to step 1203 and determines the cluster configuration and the cluster-specific reference signal configuration. For example, the mobile station determines the cluster configuration and the cluster-specific reference signal configuration according to the information acquired in step 1201. For example, the mobile station determines whether some clusters are operated and what a cluster to which it belongs is. The mobile station verifies a position of a cluster-specific reference signal region and determines a reference signal transmission position of the cluster to which it belongs and a reference signal transmission position of another cluster through an offset, a period, an index, and the number of clusters.

The mobile station proceeds to step 1205, receives a cluster-specific reference signal transmitted from a base station, and measures channel gains for clusters using the cluster-specific reference signal. For example, because the mobile station determines the cluster-specific reference signal configuration in step 1203, the mobile station may classify cluster-specific reference signals. Accordingly, the mobile station may measure the channel gains for clusters. The channel gain includes at least one of an RSSI, received signal power, a channel response value, and a channel response magnitude.

The mobile station proceeds to step 1207 and transmits a measurement result report using the cluster-specific reference signal. The measurement result report includes information based on the channel gain measured in step 1205. For example, the measurement result report includes channel gains for clusters or values determined from the channel gains. For example, the measurement result report may include at least one of channel gains for clusters, channel quality, interference information, an SIR, and an IINR. For example, the mobile station may calculate at least one of channel quality, interference information, an SIR, and an IINR from the channel gain and may transmit the calculated value.

Figure 13:
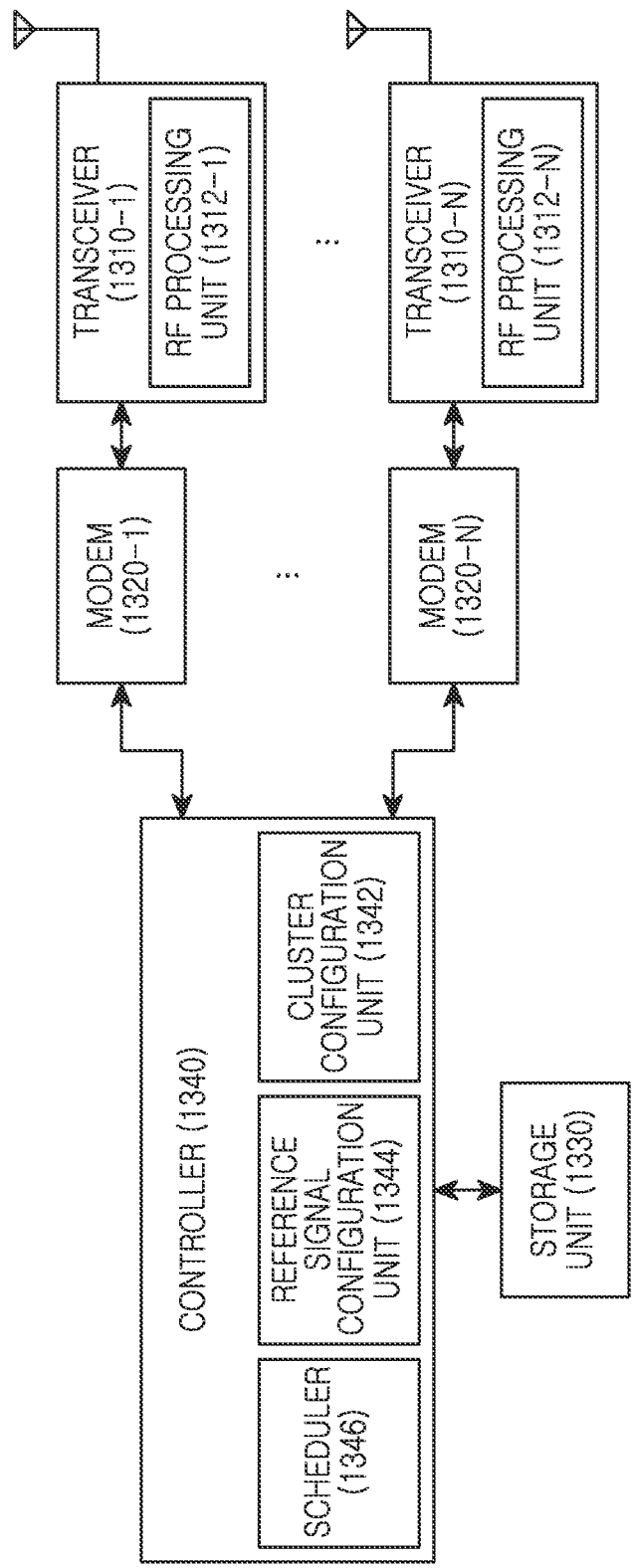
FIG. 13 is a block diagram illustrating configuration of a base station in a wireless communication system according to an exemplary embodiment of the present invention.

FIG. 13 is a block diagram illustrating configuration of a base station in a wireless communication system according to an exemplary embodiment of the present invention.

Referring to FIG. 13, the base station includes a plurality of transceivers 1310-1 to 1310-N, a plurality of modems 1320-1 to 1320-N, a storage unit 1330, and a controller 1340.

The plurality of transceivers 1310-1 to 1310-N are distributed and installed with one another. Each of the plurality of transceivers 1310-1 to 1310-N performs a function for transmitting and receiving signals through a wireless channel. For example, the plurality of transceivers 1310-1 to 1310-N include a plurality of Radio Frequency (RF) processing units 1312-1 to 1312-N, respectively. Each of the RF processing units 1312-1 to 1312-N performs conversion between a baseband signal and an RF signal. For example, each of the RF processing units 1312-1 to 1312-N may include an amplifier, a mixer, an oscillator, a Digital to Analog Converter (DAC), an Analog to Digital Converter (ADC), etc.

Each of the plurality of modems 1320-1 to 1320-N performs a conversion function between a baseband signal and a bitstream according to physical layer standard of the wireless communication system. For example, when transmitting data, the plurality of modems 1320-1 to 1320-N generate complex symbols by encoding and modulating transmission bitstreams. Also, when receiving data, the plurality of modems 1320-1 to 1320-N restore reception bitstreams by demodulating and decoding baseband signals provided from the plurality of transceivers 1310-1 to 1310-N. When the wireless communication system uses an Orthogonal Frequency Division Multiplexing (OFDM) scheme, the plurality of modes 1320-1 to 1320-N may further perform a Fast Fourier Transform (FFT) computation and an Inverse Fast Fourier Transform (IFFT) computation.

In the case of FIG. 13, the plurality of modems 1320-1 to 1320-N are shown. However, in accordance with another exemplary embodiment of the present invention, the plurality of modems 1320-1 to 1320-N may be configured as one block. In this case, one modem processes signals corresponding to the plurality of transceivers 1310-1 to 1310-N successively or in parallel. In accordance with another exemplary embodiment of the present invention, each of the plurality of modems 1320-1 to 1320-N may be included in a corresponding transceiver. For example, each of the plurality of transceivers 1310-1 to 1310-N may include a corresponding RF processing unit and a corresponding modem.

The storage unit 1330 stores a program for an operation of the base station and data such as system information and setup information. The storage unit 1330 provides the stored data according to a request of the controller 1340.

The controller 1340 controls overall functions of the base station. For example, the controller 1340 collects information about communication environments of the plurality of transceivers 1310-1 to 1310-N and optimizes the wireless communication system. In more detail, the controller 1340 includes a cluster configuration unit 1342 for configuring at least one cluster using the plurality of transceivers 1310-1 to 1310-N, a reference signal configuration unit 1344 for determining a cluster-specific reference signal configuration, and a scheduler 1346 for performing cluster-based resource allocation. The cluster configuration unit 1342, the reference signal configuration unit 1344, and the scheduler 1346 may be at least one processor for implementing a corresponding function or may be at least one processor for performing a software module including an instruction for performing a corresponding function. In this case, the software module may be stored in the storage unit 1330.

In accordance with an exemplary embodiment of the present invention, the controller 1340 may change a cluster configuration in consideration of cell conditions, user distribution, etc. The controller 1340 may define each of the plurality of transceivers 1310-1 to 1310-N as one cluster. The controller 1340 may configure a cluster including a plurality of transceivers using a measurement result report for reference signals received from mobile stations. For example, the controller 1340 may determine, as described with reference to FIGS. 9 and 10, the cluster configuration.

In accordance with an exemplary embodiment of the present invention, the controller 1340 determines the cluster-specific reference signal configuration. The cluster-specific reference signal configuration may be changed according to the number of clusters, reference signal density, etc. In more detail, the controller 1340 allocates a cluster-specific reference signal region. For example, the cluster-specific reference signal region may be allocated as shown in FIG. 3. The controller 1340 sets parameters related to the cluster-specific reference signal. For example, the parameters include at least one of an offset, a period, the number of clusters, and indexes of clusters. The offset indicates a resource position where a reference signal is started and the period indicates an interval at which a reference signal is repeated. The number of clusters indicates the number of clusters which are configured by the base station and the index indicates the order of a reference signal allocated to each cluster.

In accordance with an exemplary embodiment of the present invention, the controller 1340 may perform resource allocation in consideration of interference. For example, the controller 1340 classifies mobile stations which receive interference from a neighboring cluster and mobile stations which do not receive interference from the neighboring cluster. The controller 1340 defines an exclusive resource range between clusters in consideration of the mobile stations which receive the interference and allocates resources in the defined resource range. Herein, the exclusive resource range may be changed according to a transmission time point and a scheduling time point. For example, the controller 1340 allocates resources to a mobile station which receives interference in a partial range or a transceiver which communicates with the mobile station which receives the inference among all resource. The controller 1340 allocates resources to another mobile station in the same cluster in the other range except for the partial range or a transceiver which communicates with the another mobile station. The controller 1340 allocates resources to a mobile station in a cluster which provides the interference in the other range or a transceiver in the cluster which provides the interference.

In accordance with an exemplary embodiment of the present invention, the controller 1340 transmits information about the cluster configuration and information about the cluster-specific reference signal configuration to mobile stations through the plurality of modems 1320-1 to 1320-N and the plurality of transceivers 1310-1 to 1310-N. The controller 1340 transmits the cluster-specific reference signal according to the cluster-specific reference signal configuration. At this time, the controller 1340 transmits its own cluster-specific reference signals in a state where a plurality of transceiver groups are synchronized. In more detail, the controller 1340 performs a control operation to transmit a reference signal of each cluster signal, through at least one transceiver which belongs to each cluster, at intervals indicated by the period, in the order indicated by the indexes of clusters, from a position indicated by the offset, in a cluster-specific reference signal region. The controller 1340 performs system optimization using a measurement result report for the cluster-specific reference signal. The measurement result report includes channel gains for clusters measured by mobile stations which receive the cluster-specific reference signal or values determined from the channel gains. For example, the controller 1340 performs, as described with reference to FIGS. 7 and 8, interference control, or may change, as described with reference to FIGS. 9 and 10, a cluster configuration.

Figure 14:
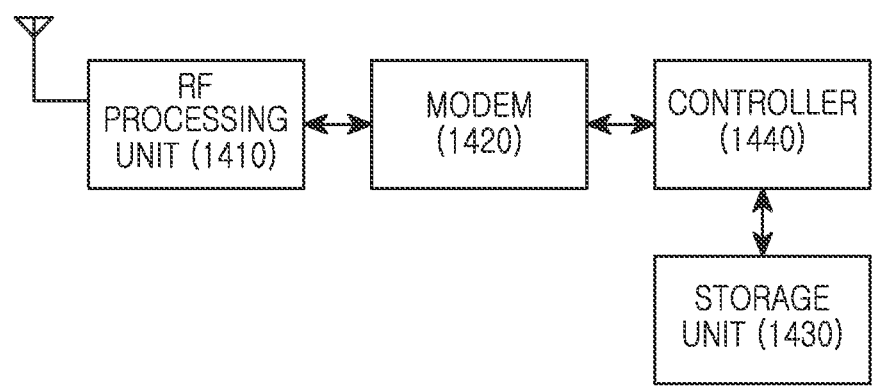
FIG. 14 is a block diagram illustrating configuration of a mobile station in a wireless communication system according to an exemplary embodiment of the present invention.

FIG. 14 is a block diagram illustrating configuration of a mobile station in a wireless communication system according to an exemplary embodiment of the present invention.

Referring to FIG. 14, the mobile station includes an RF processing unit 1410, a modem 1420, a storage unit 1430, and a controller 1440. The RF processing unit 1410 performs a function for transmitting and receiving signals through a wireless channel, such as a signal band conversion function, a signal amplification function, etc. For example, the RF processing unit 1410 up-converts a baseband signal provided from the modem 1420 into an RF band signal and transmits the converted RF band signal through an antenna. The RF processing unit 1410 down-converts an RF band signal received through the antenna into a baseband signal. For example, the RF processing unit 1410 may include an amplifier, a mixer, an oscillator, a DAC, an ADC, etc.

The modem 1420 performs a conversion function between a baseband signal and a bitstream according to physical layer standard of the wireless communication system. For example, when transmitting data, the modem 1420 generates complex symbols by encoding and modulating transmission bitstreams. Also, when receiving data, the modem 1420 restores reception bitstreams by demodulating and decoding baseband signals provided from the RF processing unit 1410. When the wireless communication system uses an OFDM scheme, the modem 1420 may further perform an FFT computation and an IFFT computation.

The storage unit 1430 stores a basic program for an operation of the mobile station, an application program, and data such as system information and setup information. The storage unit 1430 provides the stored data according to a request of the controller 1440.

The controller 1440 controls overall operations of the mobile station. In accordance with an exemplary embodiment of the present invention, the controller 1440 acquires information about a cluster configuration and information about a cluster-specific reference signal configuration transmitted from a base station. For example, the information about the cluster configuration and the information about the reference signal configuration may be received through a broadcasting channel. The controller 1440 determines the cluster configuration and the cluster-specific reference signal configuration according to the acquired information. For example, the controller 1440 determines whether some clusters are operated and what a cluster to which it belongs is. The controller 1440 verifies a position of a cluster-specific reference signal region and determines a reference signal transmission position of the cluster to which it belongs and a reference signal transmission position of another cluster through an offset, a period, an index, and the number of clusters. The controller 1440 receives a cluster-specific reference signal transmitted from the base station through the RF processing unit 1410 and the modem 1420, and measures channel gains for clusters using the cluster-specific reference signal. Also, the controller 1440 transmits a measurement result report using the cluster-specific reference signal. The measurement result report includes channel gains for clusters or values determined from the channel gains.

In the wireless communication system based on clusters which are dynamically changed according to interference, user distribution, traffics, etc., channel conditions for clusters may be effectively determined and the wireless communication system may be optimized by providing a cluster-specific reference signal.

Embodiments of the present invention according to the claims and description in the specification can be realized in the form of hardware or a combination of hardware and software.

Such software may be stored in a non-transitory computer readable storage medium. The non-transitory computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are examples of non-transitory machine-readable storage that are suitable for storing a program or programs comprising instructions that, when executed, implement embodiments of the present invention. Exemplary embodiments provide a program comprising code for implementing apparatus or a method as claimed in any one of the claims of the present disclosure and a non-transitory machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. An operation method of a mobile station in a wireless communication, the method comprising:
   receiving information about a cluster-specific reference signal configuration; and
   receiving cluster-specific reference signals of at least one cluster according to the cluster-specific reference signal configuration,
   wherein the cluster denotes a service coverage unit configured by at least one transceiver set, and
   wherein the information about the cluster-specific reference signal configuration includes at least one of a resource region allocated for the cluster-specific reference signal, an offset indicating a resource position where the cluster-specific reference signal is started, a period indicating an interval at which a cluster-specific reference signal of a same cluster is repeated, a number of clusters indicating the number of clusters configured by a base station, and an index indicating an order of a cluster-specific reference signal allocated to each cluster.

2. The method of claim 1, wherein the receiving of the cluster-specific reference signals comprises:
   receiving a first cluster-specific reference signal of a first cluster in a position indicated by an index of the first cluster from a position indicated by the offset, in the resource region allocated for the first cluster-specific reference signal; and
   receiving a second cluster-specific reference signal of a second cluster in a position indicated by an index of the second cluster from a position indicated by the offset, in the resource region allocated for the second cluster-specific reference signal.

3. The method of claim 2, wherein the first and second cluster-specific reference signals are repeatedly mapped by an interval indicated by the period, in the resource region allocated for the first and second cluster-specific reference signals.

4. The method of claim 1, further comprising transmitting a measurement result report including at least one of channel gains for clusters measured using the cluster-specific reference signals and values determined from the channel gains.

5. The method of claim 1, further comprising receiving information about the cluster configuration,
wherein the information about the cluster configuration includes at least one of the number of clusters, an index of each cluster, and an index of a transceiver which belongs to each cluster.

6. An apparatus of a mobile station in a wireless communication, the apparatus comprising:
a receiver configured to receive information about a cluster-specific reference signal configuration, and to receive cluster-specific reference signals of at least one cluster according to the cluster-specific reference signal configuration,
wherein the cluster denotes a service coverage unit configured by at least one transceiver set, and
wherein the information about the cluster-specific reference signal configuration includes at least one of a resource region allocated for the cluster-specific reference signal, an offset indicating a resource position where the cluster-specific reference signal is started, a period indicating an interval at which a cluster-specific reference signal of a same cluster is repeated, a number of clusters indicating the number of clusters configured by a base station, and an index indicating an order of a cluster-specific reference signal allocated to each cluster.

7. The apparatus of claim 6, wherein the receiver is configured to receive a first cluster-specific reference signal of a first cluster in a position indicated by an index of the first cluster from a position indicated by the offset, in the resource region allocated for the first cluster-specific reference signal and to receive a second cluster-specific reference signal of a second cluster in a position indicated by an index of the second cluster from a position indicated by the offset, in the resource region allocated for the second cluster-specific reference signal.

8. The apparatus of claim 7, wherein the first and second cluster-specific reference signals are repeatedly mapped by an interval indicated by the period, in the resource region allocated for the first and second cluster-specific reference signals.

9. The apparatus of claim 6, further comprising:
a transmitter configured to transmit a measurement result report including at least one of channel gains for clusters measured using the cluster-specific reference signals and values determined from the channel gains.

10. The apparatus of claim 6, wherein the receiver is configured to receive information about the cluster configuration,
wherein the information about the cluster configuration includes at least one of the number of clusters, an index of each cluster, and an index of a transceiver which belongs to each cluster.

* * * * *